(12) United States Patent
Hobson et al.

(10) Patent No.: US 10,570,807 B2
(45) Date of Patent: Feb. 25, 2020

(54) APPARATUS AND METHOD FOR FLUID SEPARATION AND FILTERING

(71) Applicant: ABANAKI CORPORATION, Chagrin Falls, OH (US)

(72) Inventors: Mark Thomas Hobson, Chagrin Falls, OH (US); Curtis Taylor, Chagrin Falls, OH (US); Daniel Doucet, Aurora, OH (US)

(73) Assignee: Abanaki Corporation, Chagrin Falls, OH (US)

( * ) Notice: Subject to any disclaimer, the term of this patent is extended or adjusted under 35 U.S.C. 154(b) by 31 days.

(21) Appl. No.: 15/396,146

(22) Filed: Dec. 30, 2016

(65) Prior Publication Data

US 2017/0191404 A1 Jul. 6, 2017

Related U.S. Application Data

(60) Provisional application No. 62/273,747, filed on Dec. 31, 2015.

(51) Int. Cl.
| | |
|---|---|
| *F01P 11/12* | (2006.01) |
| *F01P 5/10* | (2006.01) |
| *F01P 7/14* | (2006.01) |
| *B01D 17/04* | (2006.01) |

(52) U.S. Cl.
CPC ............ *F01P 11/12* (2013.01); *B01D 17/045* (2013.01); *F01P 5/10* (2013.01); *F01P 7/14* (2013.01); *F01P 2007/146* (2013.01)

(58) Field of Classification Search
CPC ...... F01P 11/12; F01P 5/10; F01P 7/14; F01P 2007/146; B01D 17/045
USPC ....... 210/416.1, DIG. 5, 153, 230, 232, 455, 210/249, 493.3, 495
See application file for complete search history.

(56) References Cited

U.S. PATENT DOCUMENTS 4,976,852 A * 12/1990 Janik ...................... B01D 17/00
210/86

\* cited by examiner

*Primary Examiner* — Madeline Gonzalez
(74) *Attorney, Agent, or Firm* — Benesch, Friedlander, Coplan & Aronoff LLP

(57) ABSTRACT

In one embodiment disclosed herein, a fluid separation assembly includes a housing, a fluid inlet attached to the housing. a fluid outlet attached to the housing; a mounting bracket; coalescing media; and a cover. The housing includes a first chamber; a second chamber; a wall separating the first chamber and second chamber; and a fluid passage positioned between the first chamber and the second chamber. The fluid inlet is in fluid communication with the first chamber, and the fluid outlet is in fluid communication with the second chamber. The coalescing media is positioned in the first chamber; and the cover is reversible secured to the housing. The fluid separation assembly can further include a first spigot attached to the housing and in fluid communication with the first chamber, and a second spigot attached to the housing and in fluid communication with the second chamber.

17 Claims, 23 Drawing Sheets

APPARATUS AND METHOD FOR FLUID SEPARATION AND FILTERING

RELATED APPLICATION

This application claims priority to U.S. Provisional Patent Application Ser. No. 62/273,747, titled "Apparatus and Method for Fluid Separation and Filtering," which was filed on Dec. 31, 2015, which is expressly incorporated by reference herein in its entirety.

FIELD OF INVENTION

The present disclosure generally relates to the separation and filtering of fluids. More specifically, the present disclosure relates to apparatus and methods for separating and filtering fluids used for cooling machinery.

BACKGROUND

Many industrial processes include the use of complex systems and machines with numerous moving parts. One general concern regarding such industrial processes, especially manufacturing processes, is that such machines typically generate heat that, if unregulated, can elevate the operating temperature of systems and machines to the detriment of the industrial process. Machines typically generate heat because of friction between components, the use of motors and pumps, as a result of changes to pressure and volume, and so on. If operating temperatures are too high, machines can fail due to fatigue fractures, component deformations, stress cracks, and other such preventable wear and tear.

To counteract such preventable wear and tear, coolants are often used to cool machines and, thus, maintain an advantageous operating temperatures for systems and machines. Typically coolants can comprise water or "antifreeze," which is typically a solution of water and one or more additive (such as, for example, an organic chemical such as ethylene glycol, diethylene glycol, or propylene glycol). Such coolants are often placed in direct contact with machines and their moving components so that heat can be transferred from the machine to the coolant, resulting in a lower operating temperature for the machine.

Coolants are typically recycled for efficiency and conservational purposes. However, when coolants are placed in direct contact with machinery, impurities such as oil, grease, dirt, mill shavings, and other fluids and debris (generally referred to herein as "contaminants") can mix with the coolant and be carried away, resulting in contamination of the coolant. Such contaminants can reduce the lifecycle and efficiency of the coolant, can deteriorate the industrial process, and even result in damage to machines as the contaminated coolant is reused to cool the machines. There is a need for apparatus and methods for separating, filtering or otherwise cleaning coolant between applications to machinery. Such novel apparatus and methods are disclosed herein.

SUMMARY

In one embodiment disclosed herein, a fluid separation assembly includes a housing, a fluid inlet attached to the housing. A fluid outlet attached to the housing; a mounting bracket; coalescing media; and a cover. The housing includes a first chamber; a second chamber; a wall separating the first chamber and second chamber; and a fluid passage positioned between the first chamber and the second chamber. The fluid inlet is in fluid communication with the first chamber, and the fluid outlet is in fluid communication with the second chamber. The coalescing media is positioned in the first chamber; and the cover is reversible secured to the housing. The fluid separation assembly can further include a first spigot attached to the housing and in fluid communication with the first chamber, and a second spigot attached to the housing and in fluid communication with the second chamber.

Features of the housing and mounting bracket can facilitate the securing of the housing to the mounting bracket. The mounting bracket can include a first lower hook positioned proximate to the bottom of the mounting bracket, a second lower hook positioned proximate to the bottom of the mounting bracket and spaced apart from the first lower hook, and an first upper hook positioned proximate to the top of the mounting bracket. The housing can include a first slot arranged to accommodate the first lower hook and positioned proximate to the bottom of the housing, a second slot arranged to accommodate the second lower hook and positioned proximate to the bottom of the housing; and a third slot arranged to accommodate the first upper hook and positioned proximate to the top of the housing. The housing can also be arranged so that the housing can be secured to the mounting bracket multiple orientations. The housing can further include a fourth slot arranged to accommodate the second lower hook and positioned proximate to the bottom of the housing and opposite the first slot, a fifth slot arranged to accommodate the first lower hook and positioned proximate to the bottom of the housing and opposite the second slot, and a sixth slot arranged to accommodate the first upper hook and positioned proximate to the top of the housing and opposite the third slot.

In other embodiments, the fluid separation assembly can further include a reservoir attached to the housing and positioned proximate to the fluid outlet and a diverter attached to the housing and positioned proximate to the fluid inlet. The fluid separation assembly can also include one or more magnets secured to the mounting bracket to facilitate securing the assembly to a vertical metal surface. The coalescing media can have a lattice-like structure, and the coalescing media can positioned in the first chamber to generally fill the chamber by folding the coalescing media multiple times until its size generally fits the first chamber.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Figure 1:
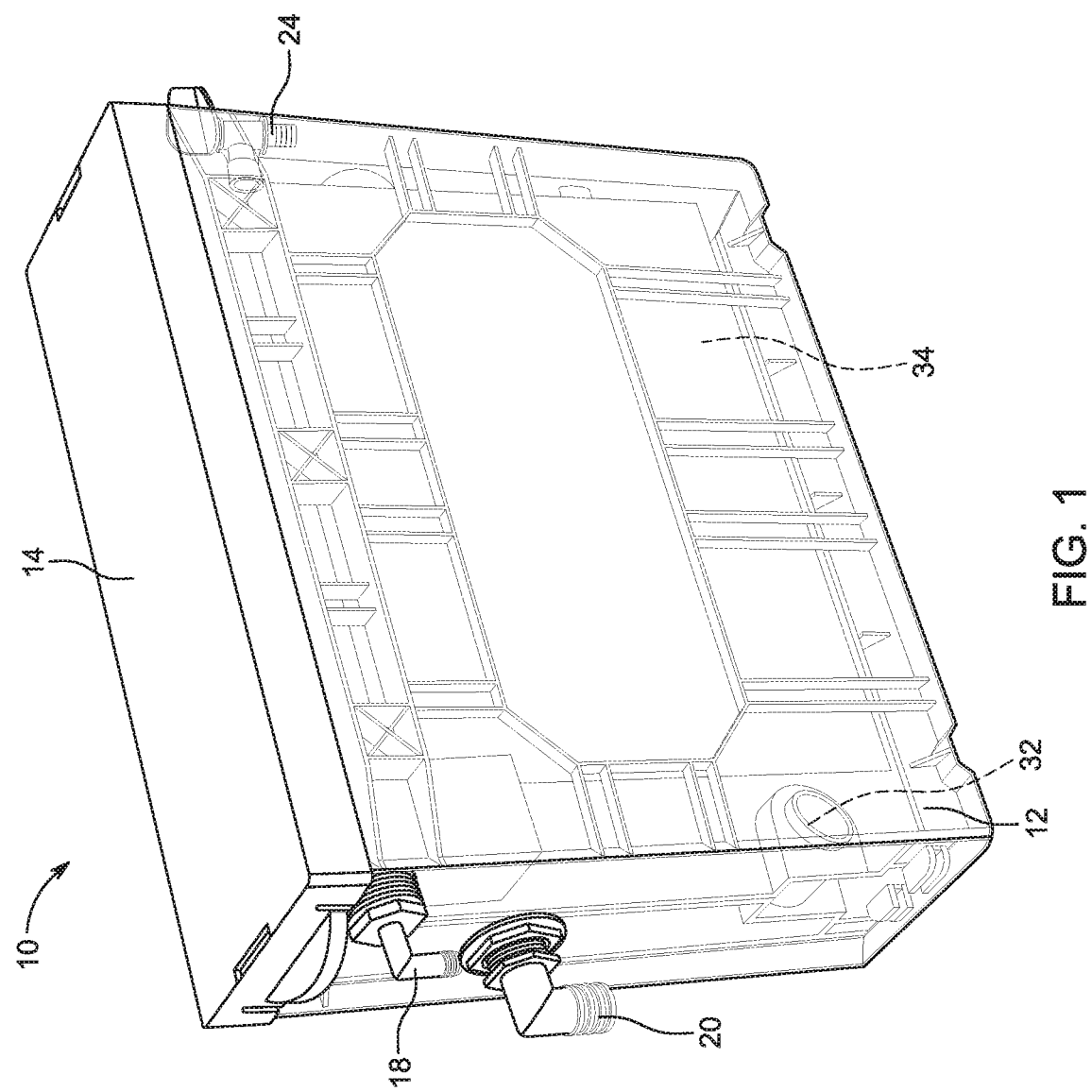
FIG. 1 is an illustration depicting a front-left perspective view of an exemplary fluid separation assembly in accordance with one embodiment.

The apparatus and methods disclosed in this document are described in detail by way of examples and with reference to the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be and should not be construed as mandatory or limiting unless specifically designated as such. Selected examples of apparatus and methods for separating and filtering fluids are hereinafter disclosed and described in detail with reference made to FIGS. 1-23.

Described herein are various embodiments of apparatus, such as a fluid separation and filtering assemblies, and methods for separating and filtering fluids. Specifically, described herein are apparatus and methods for separating and filtering contaminants from coolants used to regulate the temperatures of industrial machines and systems. Such embodiments provide for assemblies that are conveniently installed in a variety of locations within an industrial environment, including removably secured to vertical surfaces. Such an arrangement reduces or eliminates the need for the assembly to occupy floor space in an industrial environment. The assembly can be installed so that contaminated coolants can be fed into the assembly from either its left side or its right side. Such arrangements increase the flexibility of installing and using the assembly and limits or eliminates congestion and dangers posed by the tangling of hoses, tubes, or cords that are attached to the assembly that facilitate the separating and filtering of fluids. The assembly can be sized and manufactured from relatively lightweight materials to make the assembly easily portable from one location to another. The assembly can be fabricated from transparent or translucent materials to allow for visual inspection of the contaminated coolant as it passes through the assembly. Alternatively, the assembly can be fabricated from an opaque material so as to obscure the filtering and separating processes internal to the assembly. Such an arrangement can provide for a more aesthetically pleasing appearance for the assembly.

Specifically, a fluid separation and filtering assembly can be designed to separate and filter oil, grease, dirt, debris, and other foreign substances and contaminants from coolants used to regulate the temperature of industrial machines and processes. The fluid separation and filtering assembly can be arranged with a number of beneficial features and characteristics. For example, the fluid separation and filtering assembly can include an at least partially translucent or transparent housing fabricated from any number of rigid or semi-rigid polymers to allow for visual inspection of the interior of the assembly. Conversely, the fluid separation and filtering assembly can include an opaque housing fabricated from metal, fiber reinforced materials, rigid or semi-rigid polymers, and the like to obscure the internal operations of the assembly. The fluid separation and filtering assembly can be sized to be portable so that a single worker can move the assembly from one location to another in an industrial environment. Such portability allows the assembly to be efficiently and conveniently used with any number of machines and processes. In addition, such sizing can result in a relatively small footprint for the fluid separation and filtering assembly, further facilitating its efficient and convenient use with many different machines and processes. The fluid separation and filtering assembly can be arranged to be easily mountable on a vertical surface so as to limit the need to place the assembly on the floor and avoid potential mishaps due to unnecessary clutter. In addition, the mounting of the fluid separation and filtering assembly can be easily reversible (i.e., the assembly can be easily removed from its mounting surface) to further facilitate moving the assembly from one location to another in an industrial environment.

Other beneficial features and characteristics will be apparent to those of ordinary skill in the art upon reading and understanding this specification and accompanying figures. Although a fluid separation and filtering assembly may be referred to herein as a "fluid separation assembly" or simply an "assembly" for convenience, it will be understood that all such assemblies can separate fluids from one another and filter out contaminants from such fluids. Furthermore, although the examples herein are generally directed to cleaning coolants used to regulate the temperature of machinery and systems in an industrial environment, the apparatus and methods disclosed herein are equally applicable to the separation or filtering of any number of mixed or contaminated fluids.

FIGS. 1-17 illustrate exemplary embodiments of a fluid separation assembly 10. The fluid separation assembly 10 includes a main housing 12, a cover 14, and mounting bracket 16. The main housing 12 can be fabricated as multiple components that are assembled to form the main housing 12, or alternatively, the main housing 12 can be fabricated as one integrated component. The housing 12 can be fabricated from a number of materials such as, for example, any number of polymeric materials, metals, reinforced materials such as fiberglass, and so on. As will be subsequently described in detail, the main housing 12 can be arranged to accommodate a number of internal chambers and components. The main housing 12 can be arranged to include an opening along the top of the main housing 12 to facilitate access to the interior of the main housing 12. Such access can facilitate cleaning and maintenance of the main housing 12. The cover 14 can be arranged to be removably secured to the main housing 12 and enclose the opening in the main housing 12. As will be subsequently described in detail, the main housing 12 is arranged to be removably secured to the mounting bracket 16.

The main housing 12 can include a number of ingress and egress features. In one embodiment, the main housing 12 includes a fluid inlet 18, a fluid outlet 20, a coolant spigot 22, and a contaminant spigot 24. The fluid inlet 18 is arranged to be connected to a hose so that contaminated coolant (i.e., coolant that is contaminated with oil, grease, dirt, and other debris) can flow into the fluid separation assembly 10. In one embodiment, the fluid inlet 18 can be a 0.5 inch diameter barbed fitting to facilitate efficient connecting and disconnecting of a hose to the fluid inlet 18. The fluid outlet 20 is arranged to be connected to a hose so that coolant that is filtered and separated from other fluids (i.e., coolant that is generally free of oil, grease, dirt, and other debris because such contaminants have been separated and/or filtered out) can flow out of the fluid separation assembly 10. In one embodiment, the fluid outlet 20 can be a 1.0 inch diameter barbed fitting to facilitate efficient connecting and disconnecting of a hose to the fluid outlet 20. The barbed fittings as described herein are but one possible connector type for the fluid inlet 18 and fluid outlet 20 and other ingress and egress features. As will be understood by one of ordinary skill in the art upon reading and understanding this disclosure, any number of connector types can be used to secure hoses, tubes, and other similar components to the fluid inlet 18 and fluid outlet 20 and other ingress and egress features.

The coolant spigot 22 is arranged so that it can be selectively opened and closed so that separated and filtered coolant (i.e., clean coolant) collected in the main housing 12 can be siphoned off as desired. The contaminant spigot 24 is arranged so that it can be selectively opened and closed so that contaminants collected in the main housing 12 can be siphoned off as desired. As will be described in further detail herein, it can be beneficial for users of the fluid separation assembly 10 to have the option of periodically or continuously siphoning off contaminants collected and segregated during the separation and filtering process. Likewise, it can be beneficial for users of the fluid separation assembly 10 to have the option of periodically or continuously siphoning off clean coolant collected and segregated after the separation and filtering process.

The main housing 12 can include two parallel and side-by-side chambers—a separation chamber 26 and a filtered coolant chamber 28. A wall 30 can be positioned between the separation chamber 26 and the filtered coolant chamber 28 to divide the two chambers 26, 28 and generally resist uncontrolled fluid flow between the separation chamber 26 and the filtered coolant chamber 28. A channel 32 can be positioned near the bottom of the fluid separation assembly 10 to allow for the controlled flow of fluid between the separation chamber 26 and the filtered coolant chamber 28.

In one embodiment, the separation chamber 26 and filtered coolant chamber 28 are each fabricated separately. Once fabricated, the separation chamber 26 and filtered coolant chamber 28 can be joined or otherwise secured together to generally form the housing 12. The separation chamber 26 and filtered coolant chamber 28 can be jointed together through a number of methods such as, for example, mechanical fasteners, sonic welding, adhesive bonding, and so on. The wall 30 separating the separation chamber 26 and filtered coolant chamber 28 can be formed by the mating of corresponding vertical surfaces of the separation chamber 26 and filtered coolant chamber 28. Likewise, the channel 32 can be at least partially formed by the mating of corresponding apertures in the separation chamber 26 and filtered coolant chamber 28. Additionally, the separation chamber 26 and filtered coolant chamber 28 can each be fabricated with apertures to accommodate additional components such as the fluid inlet 18, the fluid outlet 20, the coolant spigot 22, and the contaminant spigot 24. Separately fabricating the separation chamber 26 and filtered coolant chamber 28 can result in more economical and convenient fabrication processes. For example, fabricating separate chamber 26, 28 and joining the chambers 26, 28 to form the housing 12 can provide for less-complex and economically efficient fabrication processes than forming the housing 12 as one integral component. Furthermore, such fabrication processes can provide for the use of less expensive and less rigid materials while still maintaining the strength and mechanical integrity required for the sufficient performance of the housing 12. Although the benefits of separately fabricating the separation chamber 26 and filtered coolant chamber 28 are described herein, fabrication processes that form the housing 12 as one integral component also provide benefits and are included in the description of various embodiments of fluid separation assemblies herein.

Figure 9:
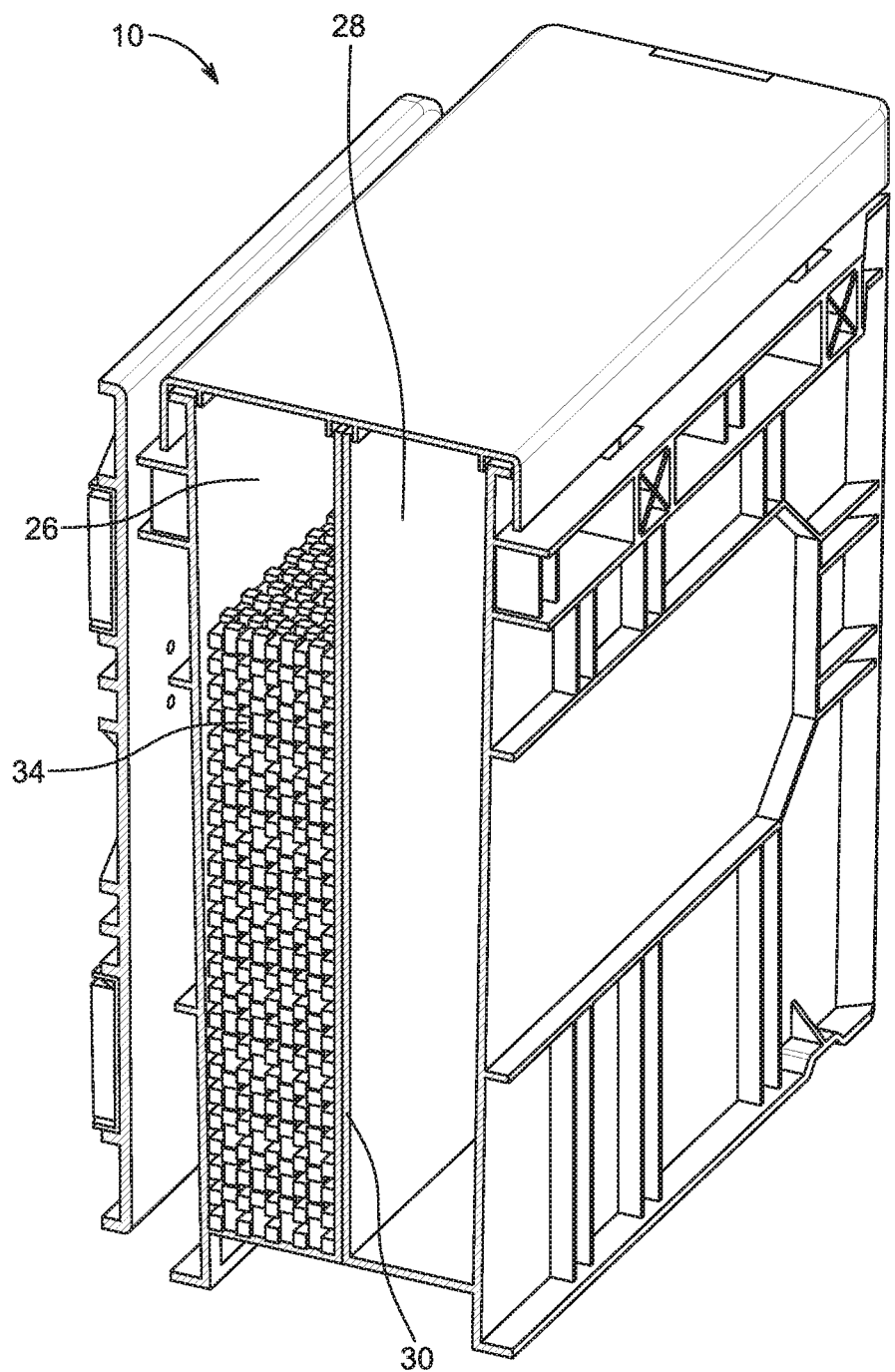
FIG. 9 is an illustration depicting a cross-sectional view of a fluid separation assembly.
Figure 10:
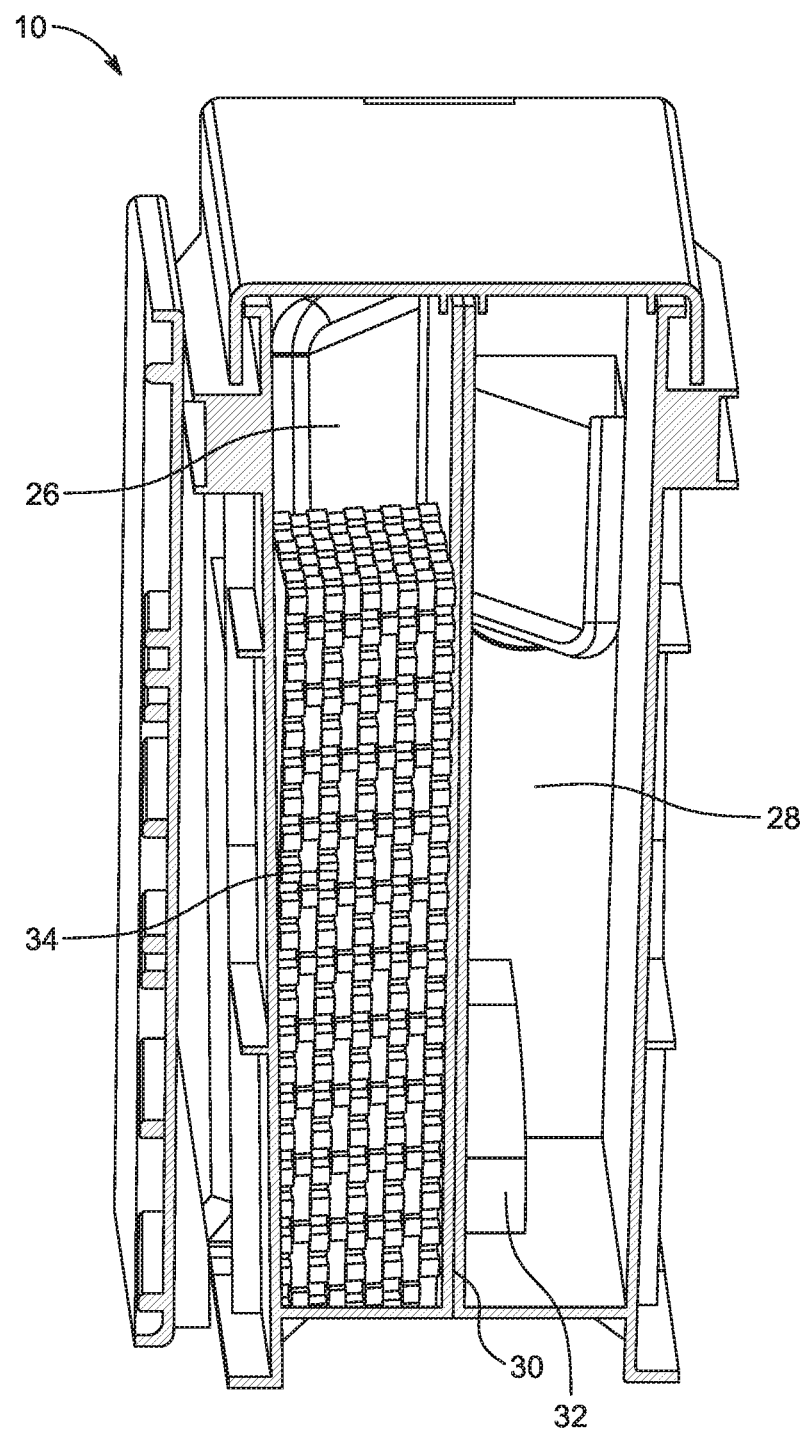
FIG. 10 is an illustration depicting a cross-sectional view of a fluid separation assembly.

The fluid inlet 18 can be arranged to lead to the separation chamber 26 so that as the contaminated coolant passes through the fluid inlet 18, the contaminated coolant is channeled into the separation chamber 26. A coalescing media 34 can be located within the separation chamber 26, where the coalescing media 34 is arranged to separate fluids and filter out contaminants from the coolant. The coalescing media 34 can be a generally porous and irregular lattice-like structure fabricated from a series of fibers. The coalescing media 34 can be arranged and positioned to generally fill the separation chamber 26 and arranged to act as a filter to capture oil, grease, dirt, debris, and other such contaminants suspended in the contaminated coolant that is passing through the separation chamber 26. When the fluid inlet 18 is located near the top of the fluid separation assembly 10, contaminants generally gather and remain near the top of the separation chamber 26 as contaminants are separated from and filtered out of the coolant. In one embodiment, the coalescing media 34 is arranged and positioned such that there is a pocket of free space in the separation chamber 26 above the coalescing media 34 (as best illustrated in FIGS. 9 and 10). Such a free space can facilitate the flow of contaminated coolant into the separation chamber 26.

The coalescing media 34 can be fabricated from any number of materials including polymeric materials. One exemplary method of fabricating the coalescing media 34 is as follows. A series of nozzles are positioned above a moving conveyor belt, where the nozzles dispense streams of molten plastic onto the moving conveyor belt. The conveyor belt is arranged to generally move forward, but also to move eccentrically from side-to-side. Further the conveyor belt can be arranged to periodically move backwards as well. Such motion coupled with the dispensing of streams of molten plastic can fabricate an irregular lattice-like structure. As the conveyor belt moves, streams of molten plastic can be dispensed onto the conveyor belt but also on top of previously dispensed streams of plastic. As will be understood, the plastic will cool and solidify as it is dispensed on the conveyor belt or onto already solidified dispensed plastic. As the conveyor belt continues to move, a continuous length of coalescing media 34 is formed. Linking and adherence between the dispensed streams of plastic can provide structural integrity to the coalescing media 34. Such linking and adherence can be achieved through mechanical adherence or mechanical or chemical cross-linking. For example, mechanical adherence can be achieved by applying an adhesive during or after the fabrication processes to secure intersection points in the lattice-like structure of the coalescing media. In another example, cross-linking can be covalent bonding or ionic bonding between polymer and can be assisted by the application of ultraviolet light or cross-linking agents.

A number of factors can determine the final structure of the coalescing media 34. For example, width of the conveyor belt and the placement of the nozzles can determine the width of the coalescing media 24. The speed of the conveyor belt and eccentric and backwards movement of the conveyor belt can determine the overall thickness of the coalescing media 34. The density of the coalescing media 34 can be determined by the placement of the nozzles, the thickness of the stream dispensed streams of molten polymer, and the motion of the conveyer belt. Such a process can result in the fabrication of a continuous length of coalescing media 34. Such continuous length of coalescing media 34 can be rolled up for further processing into useful configurations for use with fluid separation assemblies.

Once the coalescing media 34 is fabricated as described above, the coalescing media 34 can be cut into useable section to fill the separation chamber 26. For example, a length of coalescing media 34 substantially longer than the separation chamber 26 can be cut and repeatedly folded until it achieves the thickness required to fill the separation chamber 26. In another example, several length of coalescing media 34 can be cut that are about the size of the separation chamber 26 and can be layered together in the separation chamber 26 to fill the separation chamber 26. Generally, the coalescing media 34 is arranged in the separation chamber 26 such that it forms a series of contorted passages for contaminated coolant to pass through such that contaminants in the coolant come into contact with the coalescing media 34 multiple times while passing through the separation chamber 26. Causing the contaminants in the coolant to come into contact with the coalescing media 34 multiple times, increases the efficiency and effectiveness of the separating and filtering functions of the coalescing media 34.

It will be understood that the conveyor belt can also be arranged to move symmetrically so that a coalescing media is formed in a regular lattice-like pattern. In general, fabrication processes with any pattern of two-dimensional or three-dimensional movement of the conveyor belt can be utilized to form exemplary coalescing media for use with the fluid separation assemblies described herein. Furthermore, it will be understood that other fabrication processes can be used to form coalescing media and that processes described herein are exemplary only.

As the contaminated coolant fills the separation chamber 26 and moves through the coalescing media 34, much of the contaminants are quickly separated and filtered from the coolant, and the separated and filtered contaminants gather at or near the top of the separation chamber 26. Coolant separated from the contaminants flows downward toward the bottom of the separation chamber 26. Any remaining contaminants in the coolant are further separated or filtered by the coalescing media 34 as the coolant flows downward. Once at the bottom of the separation chamber 26, the coolant can pass through the channel 32 and into the filtered coolant chamber 28. As more contaminated coolant passes through the fluid inlet 18 and into the separation chamber 26, fluid pressure builds in the separation chamber 26 and forces more filtered coolant through the channel 32 and into the filtered coolant chamber 28. As the filtered coolant fills the filtered coolant chamber 28, the level rises to reach the fluid outlet 20 and clean coolant will exit the fluid separation assembly 10 though the fluid outlet 20.

Figure 3:
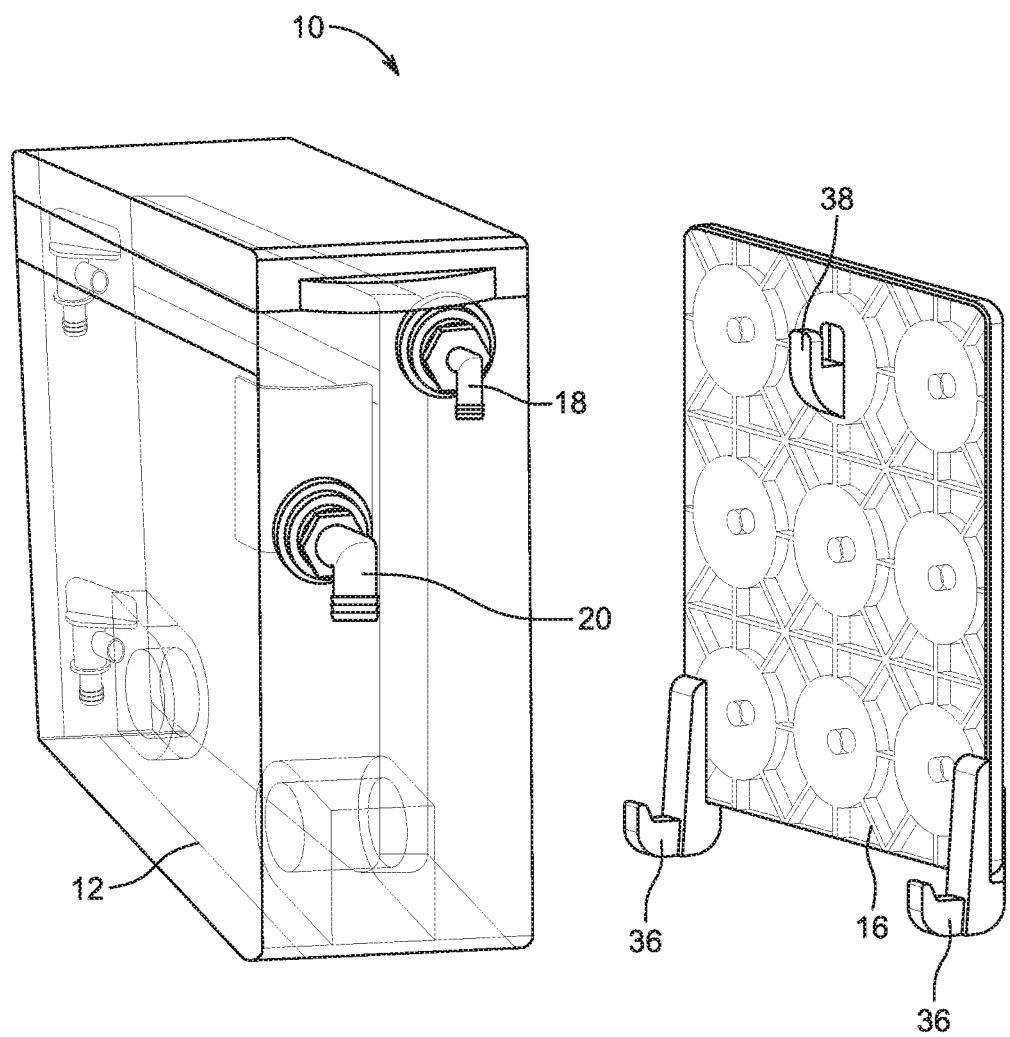
FIG. 3 is an illustration depicting an exploded view of a fluid separation assembly of FIG. 1 illustrating a mounting bracket spaced apart from a main housing.
Figure 4:
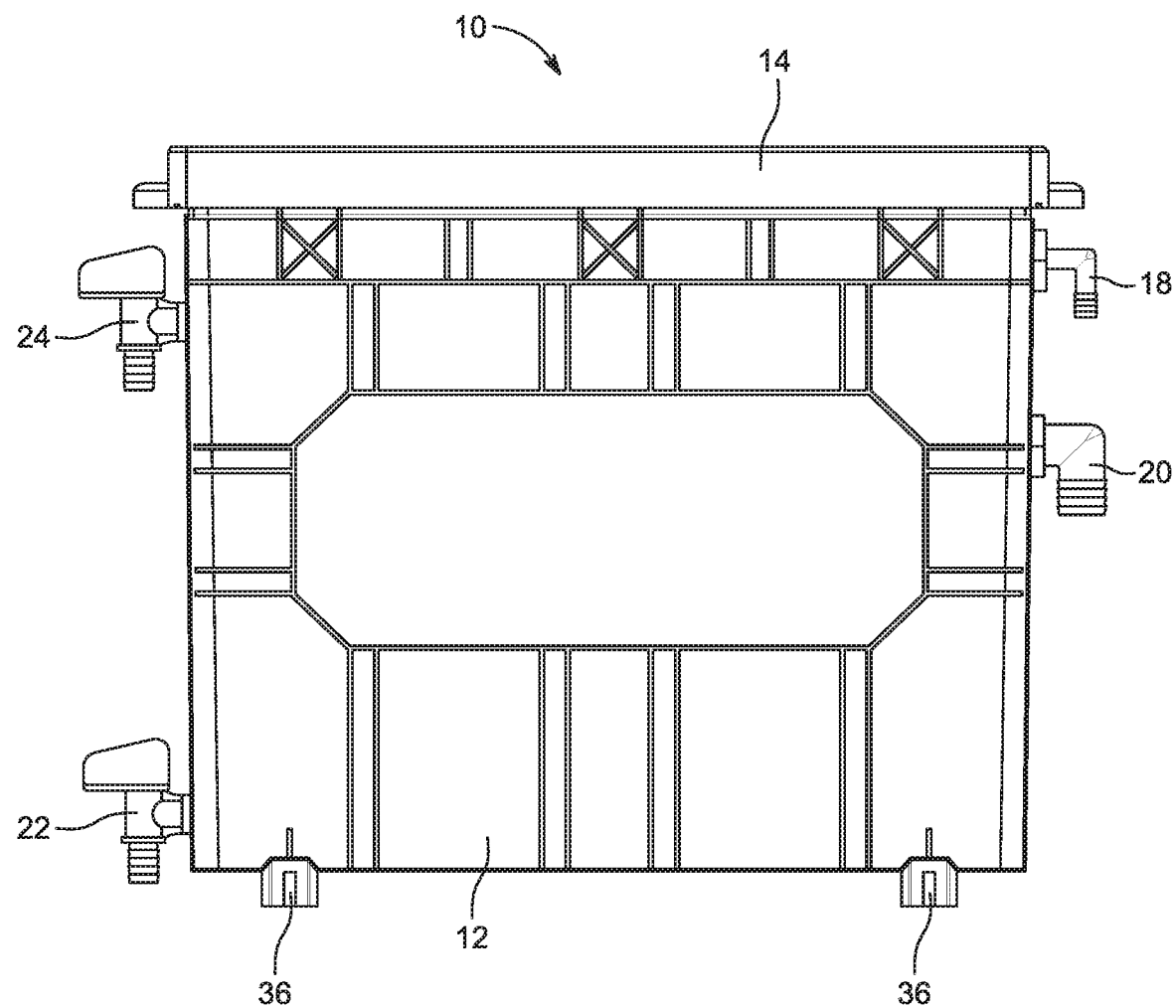
FIG. 4 is an illustration depicting a front-side elevation view of the exemplary fluid separation assembly of FIG. 1.
Figure 5:
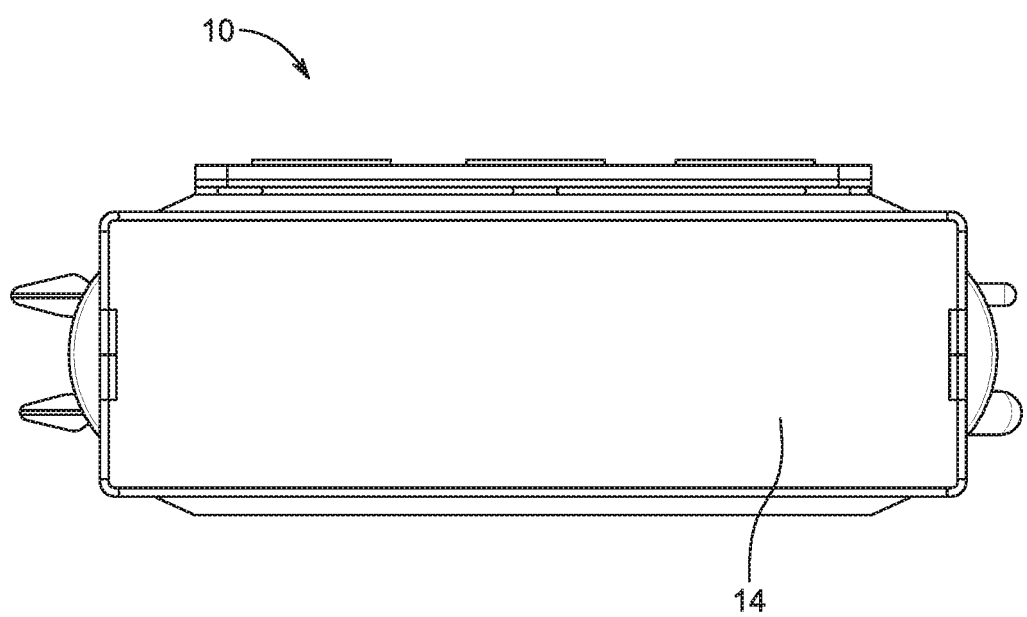
FIG. 5 is an illustration depicting a top-side view of the exemplary fluid separation assembly of FIG. 1.
Figure 6:
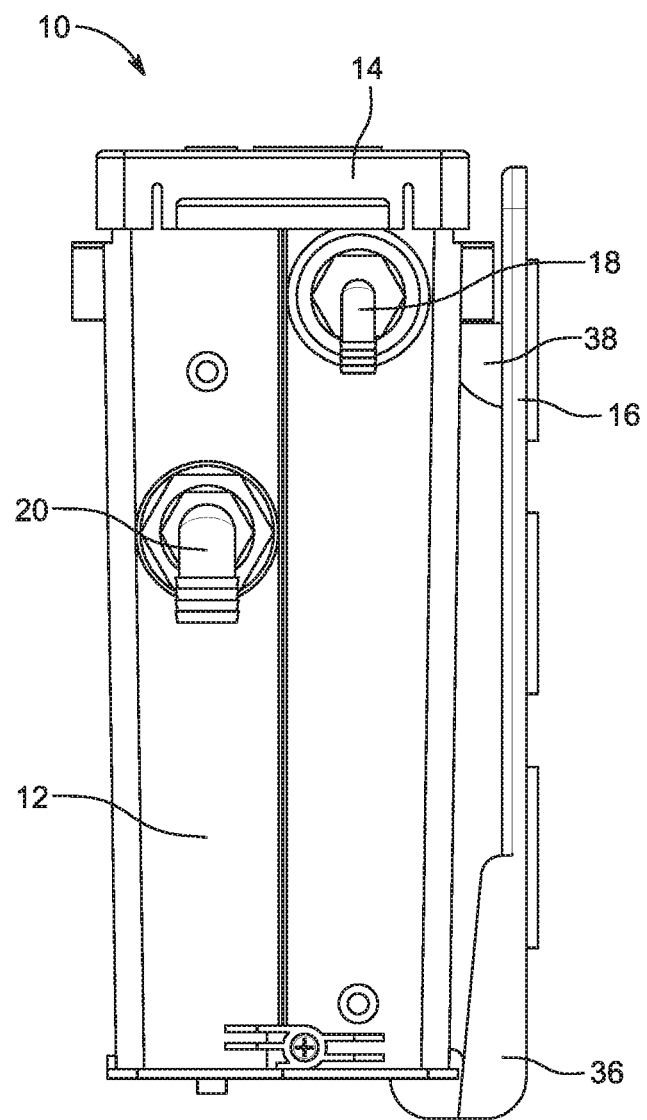
FIG. 6 is an illustration depicting a right-side view of the exemplary fluid separation assembly of FIG. 1.
Figure 7:
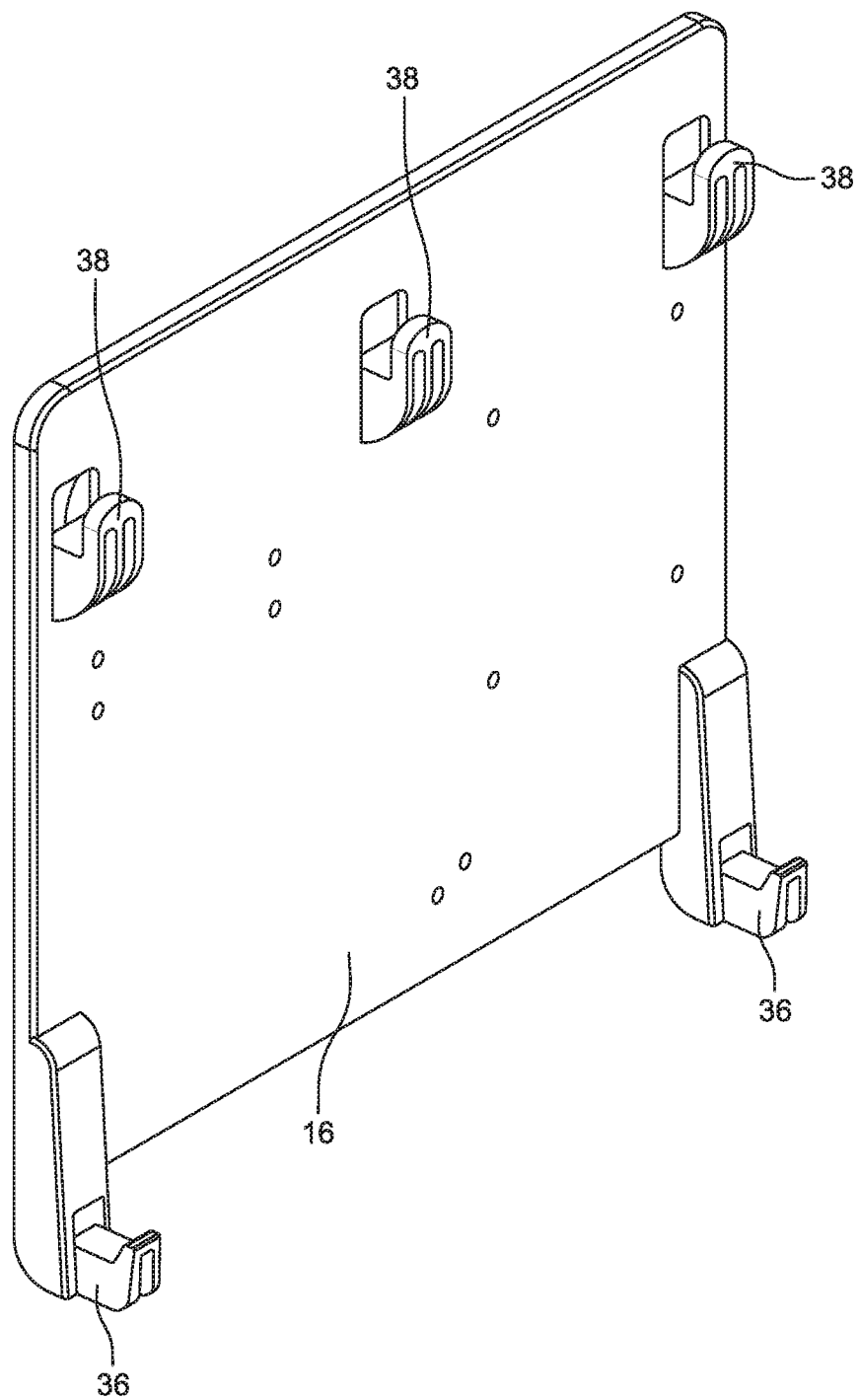
FIG. 7 is an illustration depicting an exemplary mounting bracket for use with a fluid separation assembly.

The mounting bracket 16 is arranged to be removably secured to the main housing 12. The mounting bracket 16 can include a series of hooks that engage a series of slots or other similar features on the main housing 12. In one embodiment (as best illustrated in FIG. 3), the mounting bracket 16 includes a pair of lower hooks 36 and one upper hook 38. The lower hooks 36 are arranged to be secured within slots located on the bottom of the fluid separation assembly 10. The upper hook 38 is arranged to be secured within a slot on the back of the main housing 12. In another embodiment (as best illustrated in FIG. 7), the mounting bracket 16 includes a pair of lower hooks 36 and three upper hook 38. The lower hooks 36 are arranged to be secured within slots located on the bottom of the main housing 12. The upper hooks 38 are arranged to be secured within slots on the back of the main housing 12. It will be understood that the arrangement of hooks and slots illustrated and described herein are exemplary only and that other arrangements of features are within the disclosure herein.

Figure 2:
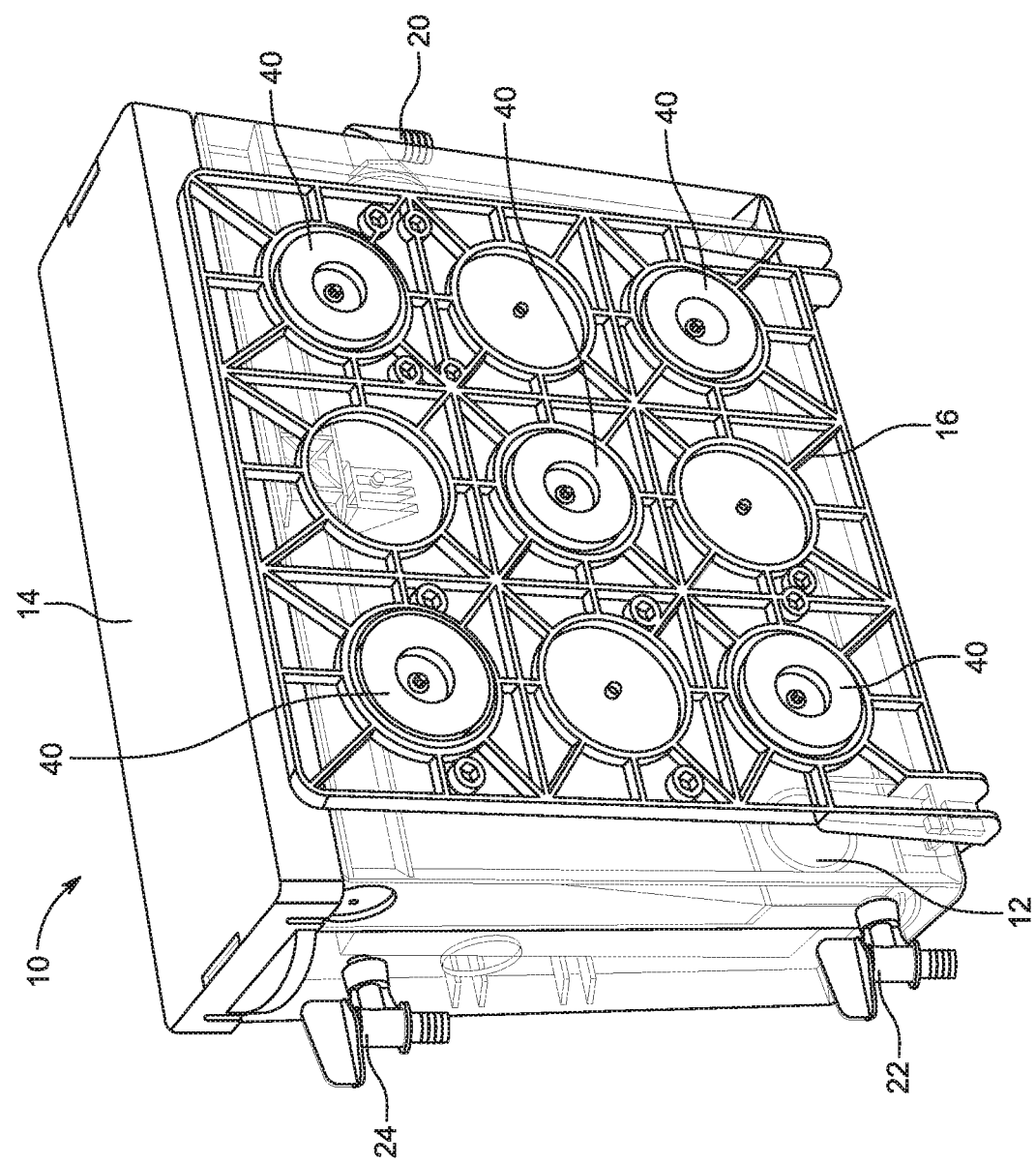
FIG. 2 is an illustration depicting a rear-right perspective view of the exemplary fluid separation assembly of FIG. 1.

The mounting bracket 16 can be arranged to be secured to a vertical surface, such as a wall or the housing of a machine. As best illustrated in FIG. 2, in one embodiment a series of magnets 40 can be secured to the backside of the mounting bracket 16. The magnets 40 can be used to secure the fluid separation assembly 10 to metallic surfaces such as the industrial machine that is being serviced by the fluid separation assembly 10. As will be understood, the number, size and magnetic force of the magnets 40 are selected to hold the weight of the fluid separation assembly 10 and the weight of the coolant passing through the fluid separation assembly 10 when the assembly is intended to be secured to a vertical metal surface. It will also be understood that alternatively other mechanisms can be employed to removably or more permanently secure a fluid separation assembly to a vertical surface. For example, hooks, screws, bolts and eyeholes, and other mechanical fastening systems can be used to secure a fluid separation assembly to a vertical surface.

When the mounting bracket 16 is secured to a vertical surface, the main housing 12 can subsequently be secured to the mounting bracket 16 via the lower hooks 36 and upper hook(s) 38. Once the fluid separation assembly 10 is so secured, coolant used to regulate the operating temperature of a proximate machine can be cleaned by passing it through the fluid separation assembly 10. Once the fluid separation assembly 10 is no longer needed for that particular machine, the main housing 12 can be removed from the mounting bracket 16, and the mounting bracket 16 can be removed from the vertical surface. The mounting bracket 16 can then be secured to another vertical surface near another machine that needs to be serviced by the fluid separation assembly 10, and the main housing 12 can be resecured to the mounting bracket 16. Hoses can be positioned between the fluid separation assembly 10 and the machine to be serviced, and the coolant for this machine can be cleaned by passing it through the fluid separation assembly 10.

Figure 8:
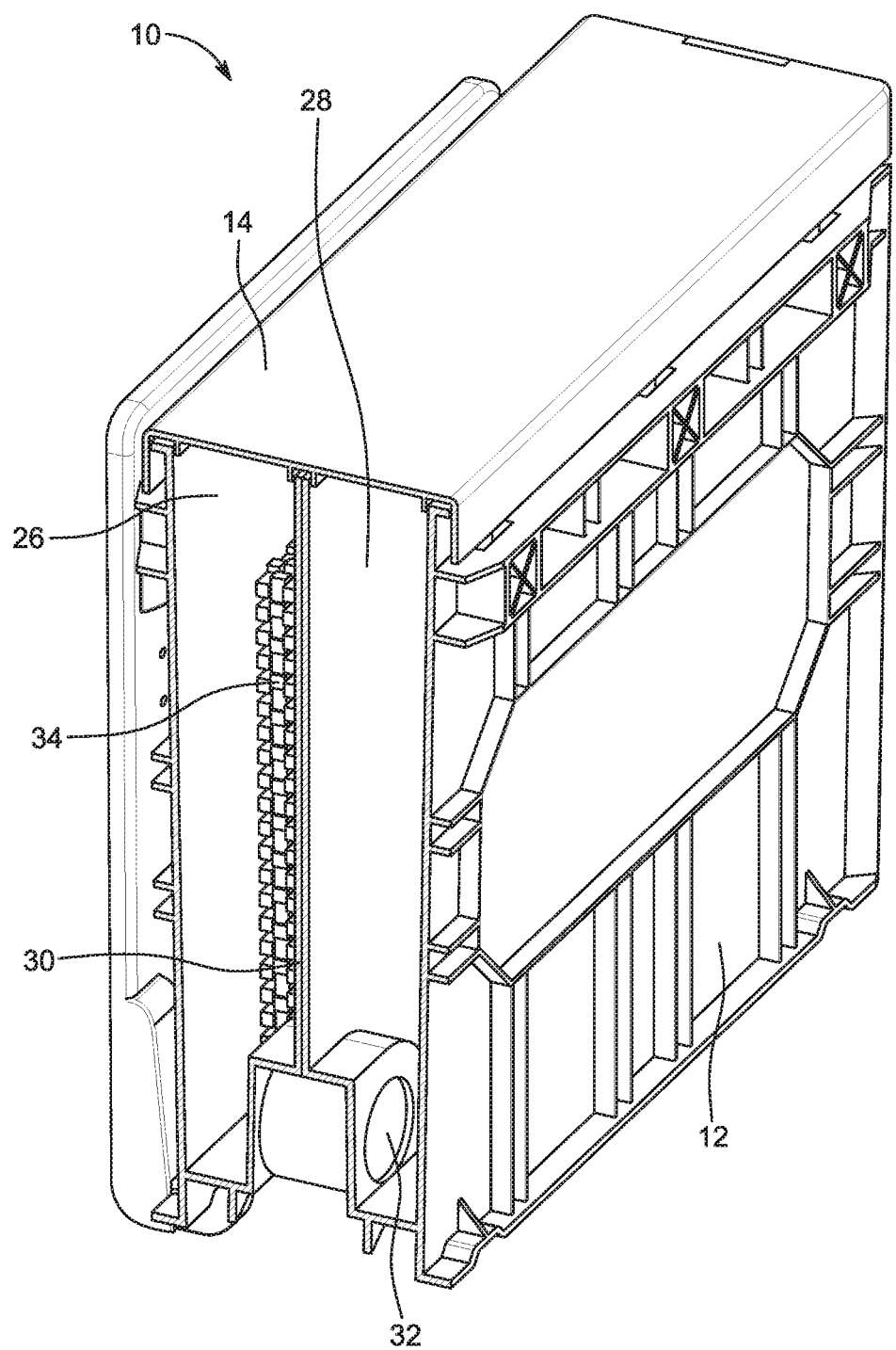
FIG. 8 is an illustration depicting a cross-sectional view of a fluid separation assembly.
Figure 11:
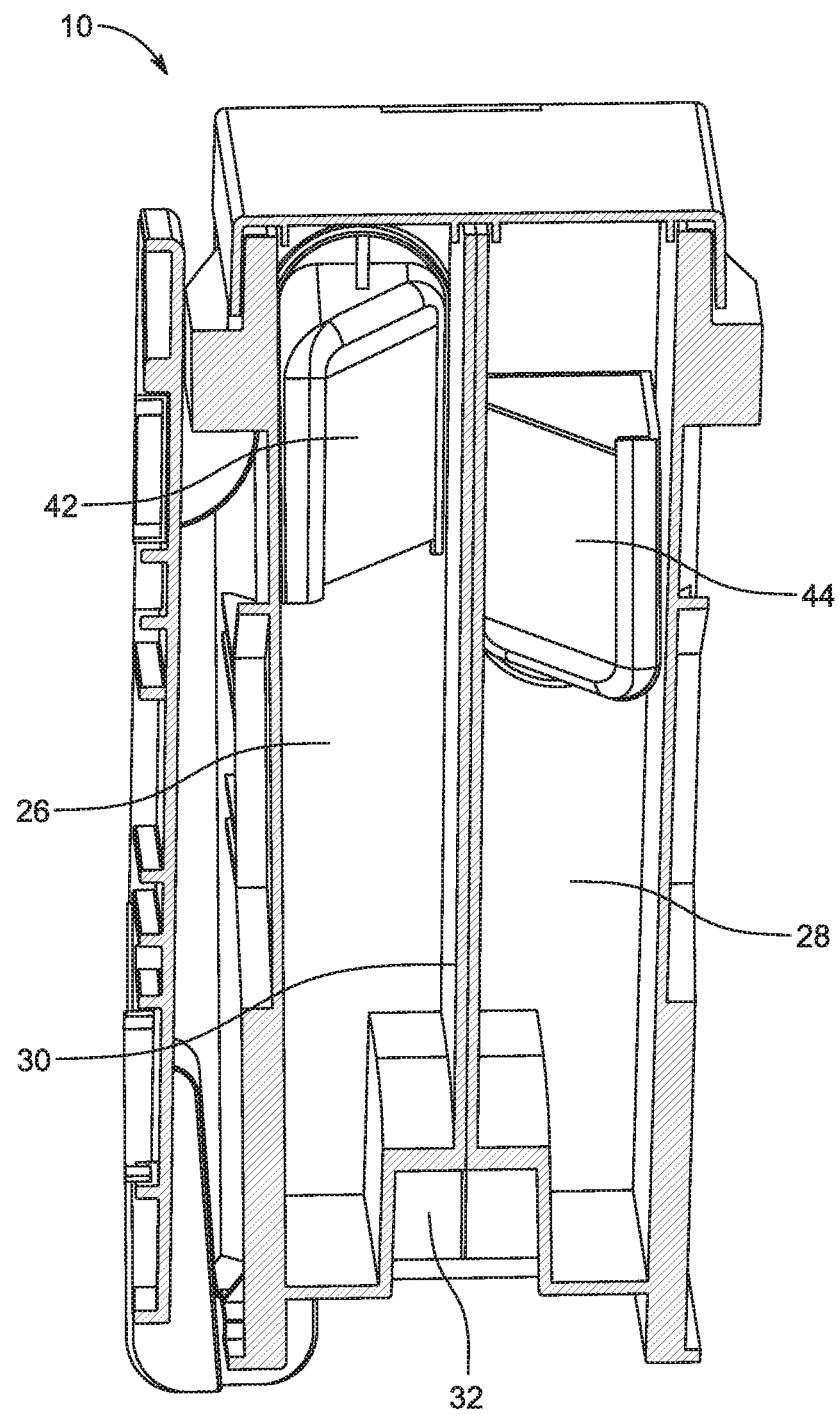
FIG. 11 is an illustration depicting a cross-sectional view of a fluid separation assembly.
Figure 12:
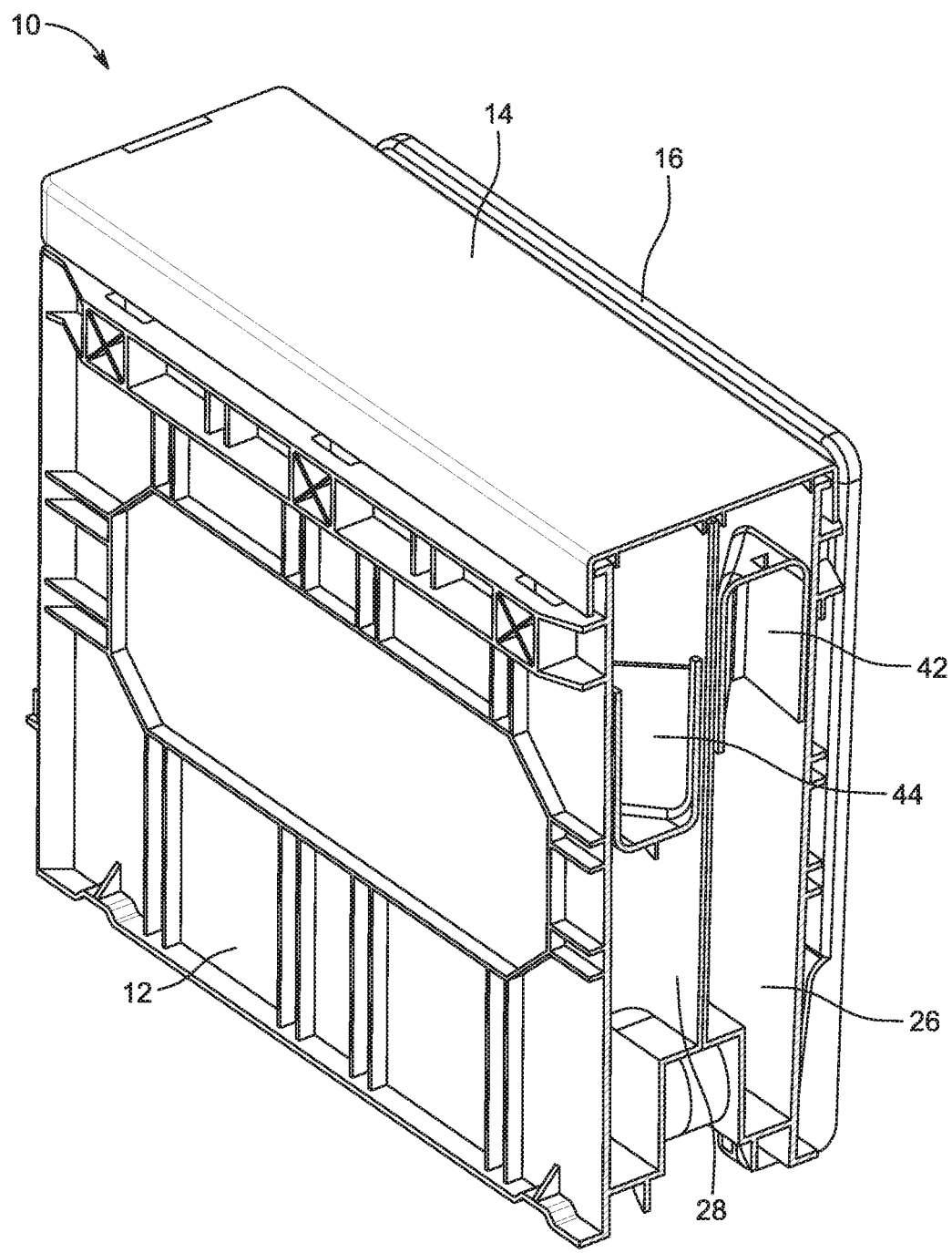
FIG. 12 is an illustration depicting a cross-sectional view of a fluid separation assembly.
Figure 13:
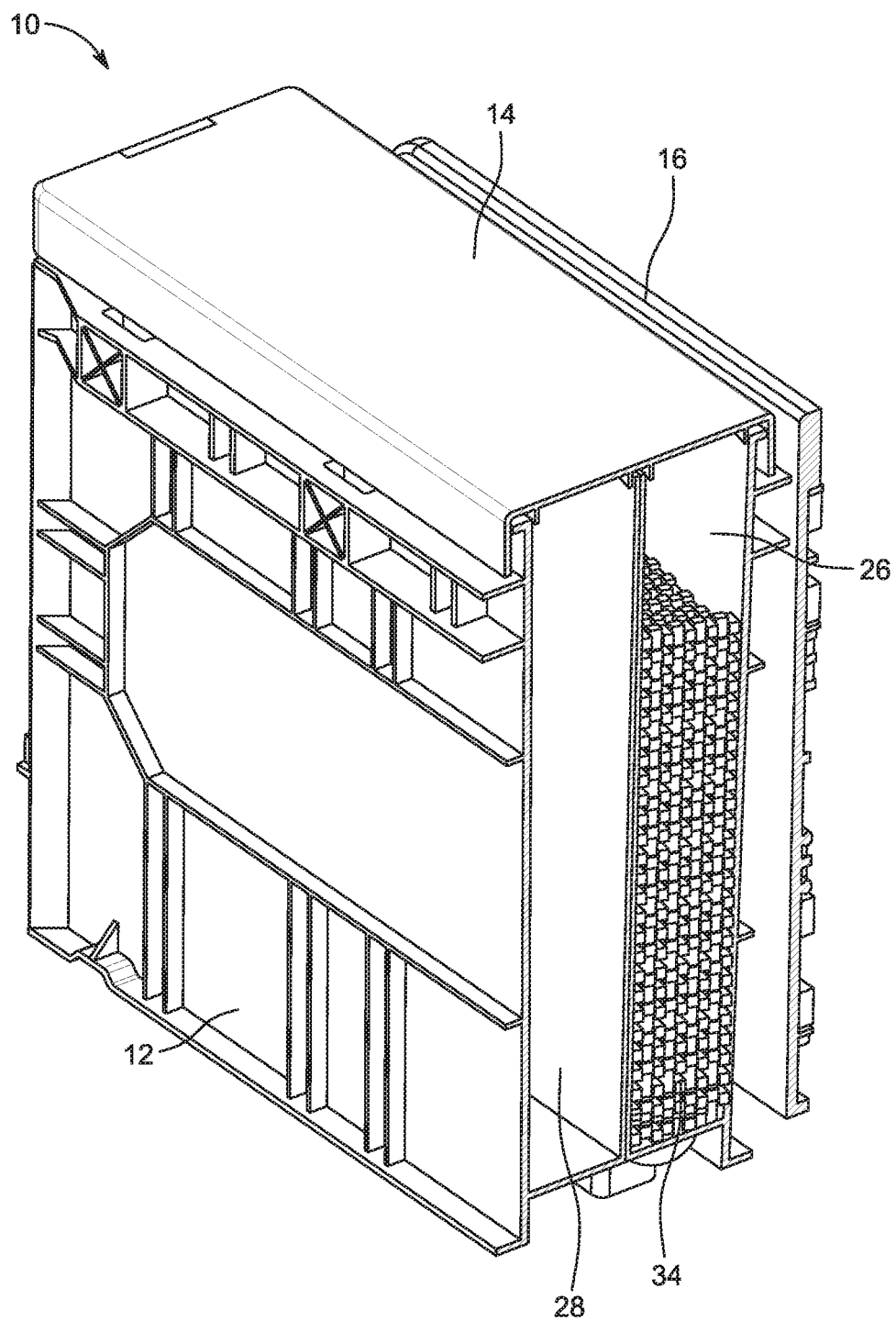
FIG. 13 is an illustration depicting a cross-sectional view of a fluid separation assembly.
Figure 14:
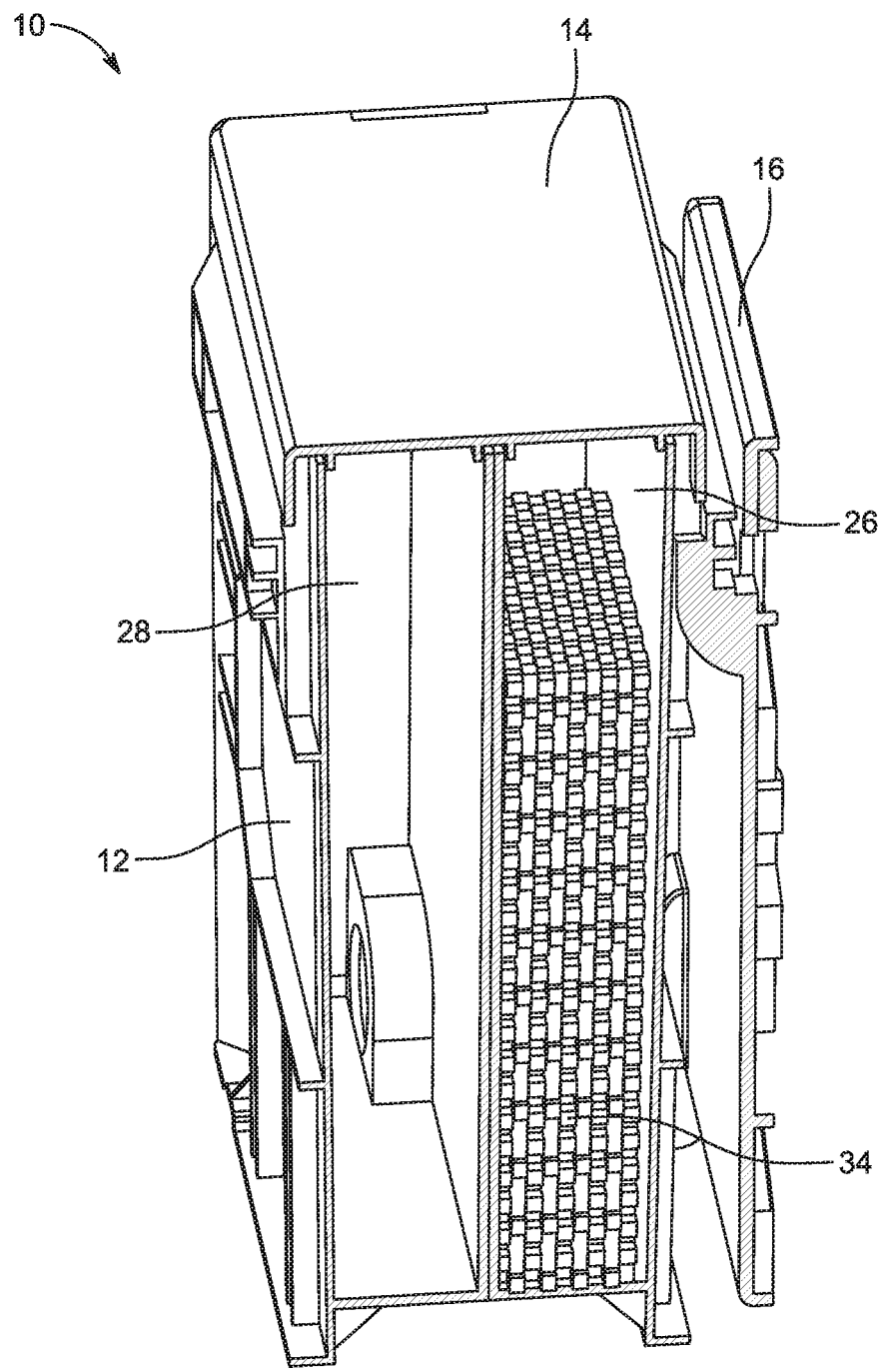
FIG. 14 is an illustration depicting a cross-sectional view of a fluid separation assembly.

FIGS. 8-14 are cross-section views of the fluid separation assembly 10 that illustrate the interior of the main housing 12. FIG. 8 illustrates the wall 30 dividing the separation chamber 26 and the filtered coolant chamber 28 and the channel 32 that provides a fluid flow path between the separation chamber 26 and the filtered coolant chamber 28. FIGS. 9, 10, 13, and 14 illustrate the coalescing media 34 positioned within the separation chamber 26. FIGS. 10 and 11 illustrate an optional diverter 42 positioned in the separation chamber 26 and an optional reservoir 44 positioned in the filtered coolant chamber 28. The diverter 42 is positioned proximate to the fluid inlet 18 and diverts the contaminated coolant flowing into the separation chamber 26 onto the coalescing media 34. The diverter 42 assists in directing and regulating the flow of contaminated coolant into the separation chamber 26. The reservoir 44 is positioned proximate to the fluid outlet 20, where the lip of the reservoir 44 is above the fluid outlet 20. As the level of cleaned coolant in the filtered coolant chamber 28 rises above the lip of the reservoir 44, the reservoir 44 fills with clean coolant, which then flows out of the fluid separation assembly 10 through the fluid outlet 20. Such an arrangement can manage any turbulence in the filtered coolant chamber 28 and, thus, regulate the flow of the clean coolant out of the fluid separation assembly 10 so that a continuous stream of clean coolant flows out of the fluid outlet 20.

Figure 15:
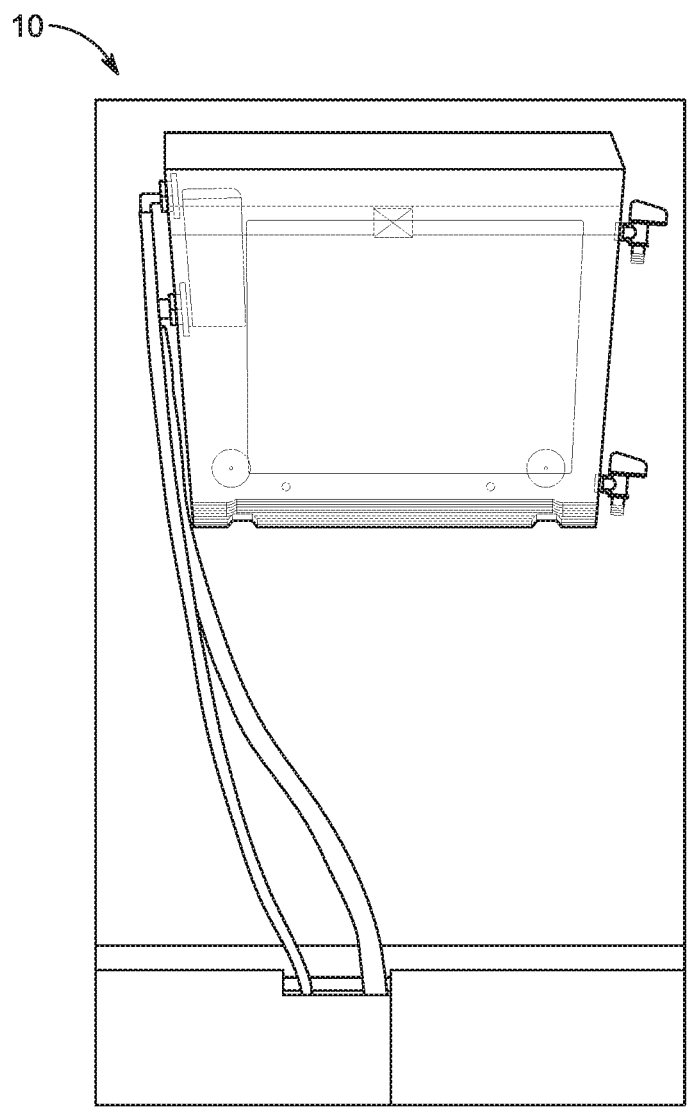
FIG. 15 is an illustration depicting an exemplary installation of a fluid separation assembly with lead and return hoses attached to the right side of the installed assembly.
Figure 16:
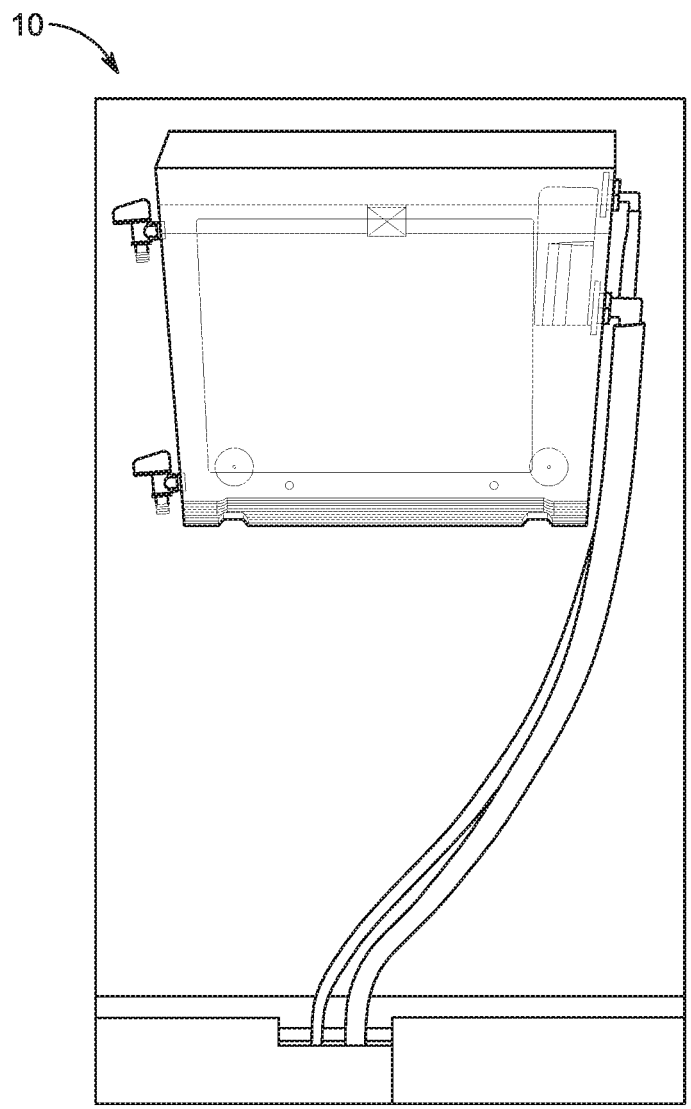
FIG. 16 is an illustration depicting an exemplary installation of a fluid separation assembly with lead and return hoses attached to the left side of the installed assembly.

FIGS. 15 and 16 illustrate the usability of the fluid separation assembly 10. The fluid separation assembly 10 can be arranged so that either the "front" or the "back" of the main housing 12 can be secured to the mounting bracket 16. Such flexibility can allow the fluid separation assembly 10 to be positioned so that the inflow of contaminated coolant and the outflow of clean coolant can be from either the "left side" or the "right side" of the fluid separation assembly 10. As illustrated in FIG. 15, the fluid separation assembly 10 is arranged so that the fluid inlet 18 and fluid outlet 20 can be positioned on the left side of the fluid separation assembly 10. In this arrangement, the "back" of the housing 12 (as viewed in FIG. 1) is secured to the mounting bracket 16. Conversely, as illustrated in FIG. 16, the fluid separation assembly 10 is arranged so that the fluid inlet 18 and fluid outlet 20 can be positioned on the left side of the fluid separation assembly 10. In this arrangement, the "front" of the housing 12 (again, as viewed in FIG. 1) is secured to the mounting bracket 16. As is best illustrated in FIG. 11, both the front and the back of the housing 12 include slots to accommodate the hooks (36, 38) of the mounting bracket 16. Thus, making the housing easily "reversible" as illustrated in FIGS. 15 and 16. With such optional mounting arrangements, the fluid separation assembly 10 can facilitate the cleaning of coolant for a variety of machine layouts, allow for the use of shorter hoses, and minimizes the clutter that can be caused by hoses having to lay across the fluid separation assembly 10.

After the fluid separation assembly 10 is put into service, the coolant spigot 22 and contamination spigot 24 allow a user the flexibility to manually remove either contaminants or clean coolant from the fluid separation assembly 10. For example, as previously noted, the main housing 12 and the wall 30 can be fabricated from transparent or translucent material. Therefore, the user can non-intrusively observe the level of contaminants and coolant collected in fluid separation assembly 10. Once the collected contaminants reach a certain level, the user can selectively discharge the collected contaminants by placing a receptacle such as a bucket or pail under the contaminant spigot 24, manually opening up the spigot 24, and discharging collected contaminants into the receptacle. Such a process can be conducted either during operation of the fluid separation assembly 10 or between operations of the fluid separation assembly 10.

Alternatively, the contaminant spigot 24 can be arranged to always be open so that contaminants that gather in the fluid separation assembly 10 continuously flow out of the fluid separation assembly 10. In such an arrangement, a hose can be attached to the contaminant spigot 24 or large receptacle can be placed under the contaminant spigot 24 to accommodate such continuous flow. In another alternative, the flow of contaminants out of the fluid separation assembly 10 can be controlled through the use of a reservoir (not shown) positioned proximate to the contamination spigot 24 similar to that described for use with the fluid outlet 20. Although the term contaminant spigot is used with this embodiment for convenience, it will be understood that for this embodiment, a fluid outlet or other such component can be used in place of a spigot. The lip of the reservoir is positioned above the level of the contaminant spigot 24. As the level of contaminant in the separation chamber 26 rises above the lip of the reservoir, the reservoir fills with contaminant, which then flows out of the fluid separation assembly 10 through the contaminant spigot 24. Such an arrangement can regulate the flow of the contaminant out of the fluid separation assembly 10 without any substantial flow of coolant out of the fluid separation assembly thought the contaminant spigot 24.

Additionally, the user can remove the cover 14 and manually remove contaminants collected in the separation chamber 26 through the opening at the top of the main housing 12. While the cover 14 is removed, the user can also remove the coalescing media 34 from the fluid separation assembly 10 and rinse the media 34 with clean water or a solvent to remove contaminants captured by the coalescing media 34. Once the coalescing media 34 is cleaned, it can be placed back in the separation chamber 26, the cover 14 can be secured to the main housing 12, and the fluid separation assembly 10 can be returned to service. Alternatively, the opening in the housing 12 can be used to remove and discard coalescing media 34 and replace it with new coalescing media 34.

If the user would like to siphon off clean coolant, the user can place a receptacle such as a bucket or pail under the coolant spigot 22, manually opening up the spigot 22, and discharging collected coolant into the receptacle. Such a process can be useful prior to moving the fluid separation assembly 10. Removal of the excess clean coolant in the fluid separation assembly 10 makes moving the assembly 10 easier and more convenient for the user.

Figure 17:
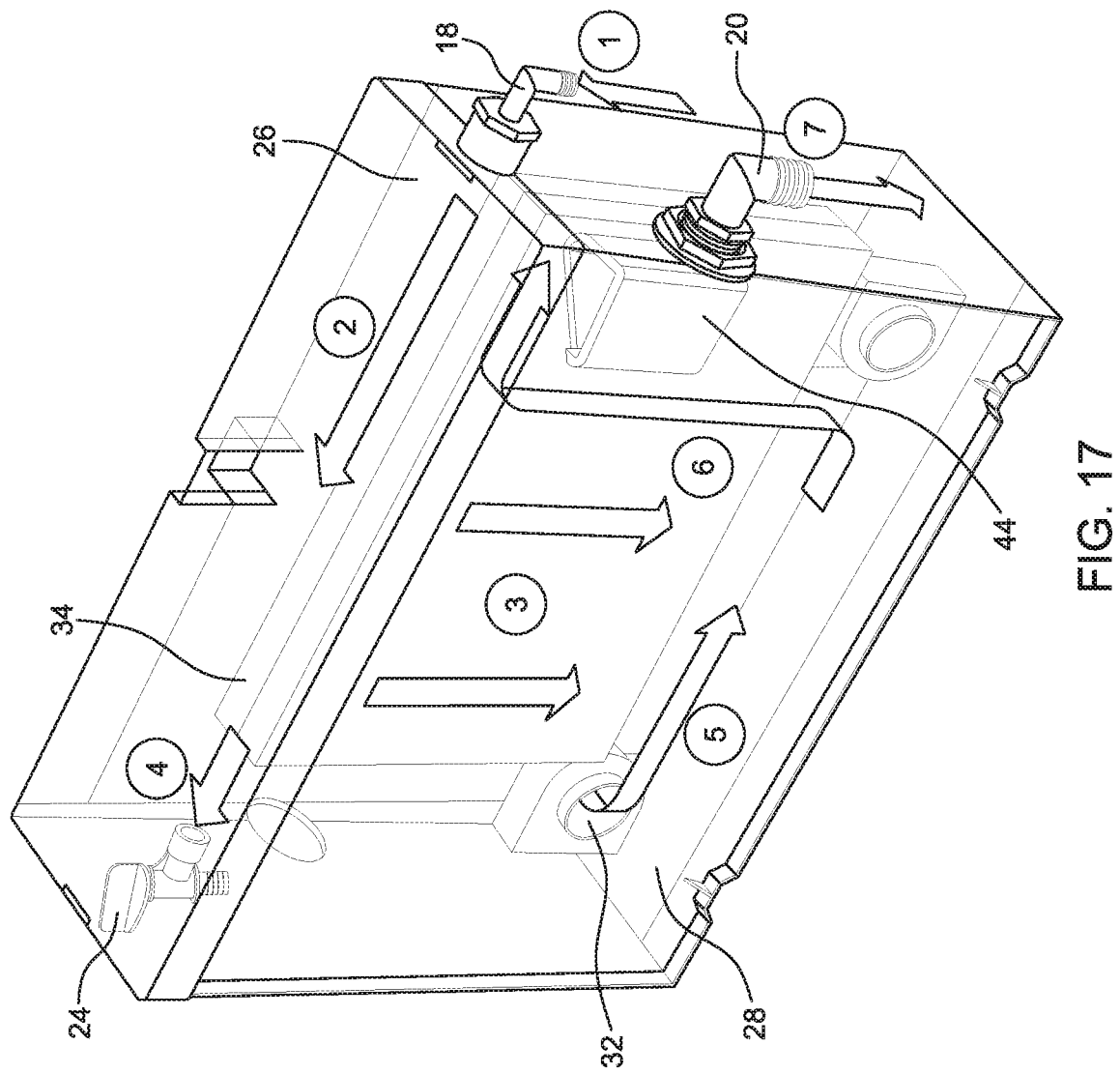
FIG. 17 is an illustration depicting an exemplary flow path through a fluid separation assembly.

FIG. 17 illustrates a typical flow of fluid through the fluid separation assembly 10 for cleaning contaminated coolant used to regulate the operating temperature of a machine. As illustrated by flow arrow 1, contaminated coolant can be pumped from a sump or reserve tank holding the contaminated coolant, through the fluid inlet 18. As illustrated by flow arrow 2, the contaminated coolant then flows into the separation chamber 26. As illustrated by flow arrows 3, the contaminated coolant can flow through the coalescing media 34, where oils and other contaminants are captured by the coalescing media 34 and/or rise to the top of the separation chamber 26, while clean coolant descends toward the bottom of the separation chamber 26. As illustrated by flow arrow 4, contaminants typically gather near the top of the separation chamber 26 and can be selectively removed or siphoned off using the contaminant spigot 24. As illustrated by flow arrow 5, coolant that gathers toward the bottom of the separation chamber 26 can flow through the channel 32 and into the filtered coolant chamber 28. As illustrated by flow arrow 6, as the level of clean coolant builds up in the filtered coolant chamber 28, clean coolant can flow over the lip of the reservoir 44 and toward the fluid outlet 20. As illustrated by flow arrow 7, once clean coolant begins to fill the reservoir 44, the clean coolant can flow through the fluid outlet 20 and back into the sump or reserve tank that holds the coolant for use with the serviced machine. Depending on the level and type of contaminants in the coolant, the contaminated coolant can be cycled through the fluid separation assembly 10 one or more times to sufficiently clean the coolant. In one embodiment, the fluid separating assembly 10 can be a permanent part of the industrial processes. This is to say that one step in the industrial process is to continuously clean the coolant during operation of the process.

It will be understood that to facilitate the use of the fluid separation assembly 10, a pump, such as, for example, a pneumatic pump, an electrical pump, or a pump equipped with a float to trigger pumping, can be used with the fluid separation assembly 10 to move contaminated coolant for a sump or reserve tank into the fluid separation assembly 10. The flow of the contaminated coolant into the fluid separation assembly 10 typically can provide the pressure required to cause cleaned coolant to move through the fluid separation assembly 10 and to flow back into the sump or reserve tank from the fluid separation assembly 10. As will be understood, the sump or reserve tank holding contaminated coolant can be part of the machine or equipment that is being cooled. For convenience, any sump or reserve tank that holds contaminated coolant for one or more machines will be referred to herein as a "reserve tank."

To further facilitate the use of a pump to move contaminated coolant from a reserve tank into the fluid separation assembly 10, a pump valve can be used in conjunction with a pump. An exemplary pump valve 50 is illustrated in FIGS. 18-23. In addition to a pump and pump valve 50, a number of hoses or tubes can be used to move contaminated coolant from a reserve tank into the fluid separation assembly 10. As will be understood, prior to starting the pumping process, it is advantageous to have fluid filling the fluid path from the reserve tank to the fluid separation assembly 10, which includes filling the hoses and pump with coolant or other fluids. Such a process can be referred to as "priming." The pump valve 50 is arranged to facilitate two separate operations or modes—a prime mode, for priming the pump and hoses, and a regular operation mode, for the moving of contaminated coolant from a reserve tank to the fluid separation assembly 10.

Figure 18:
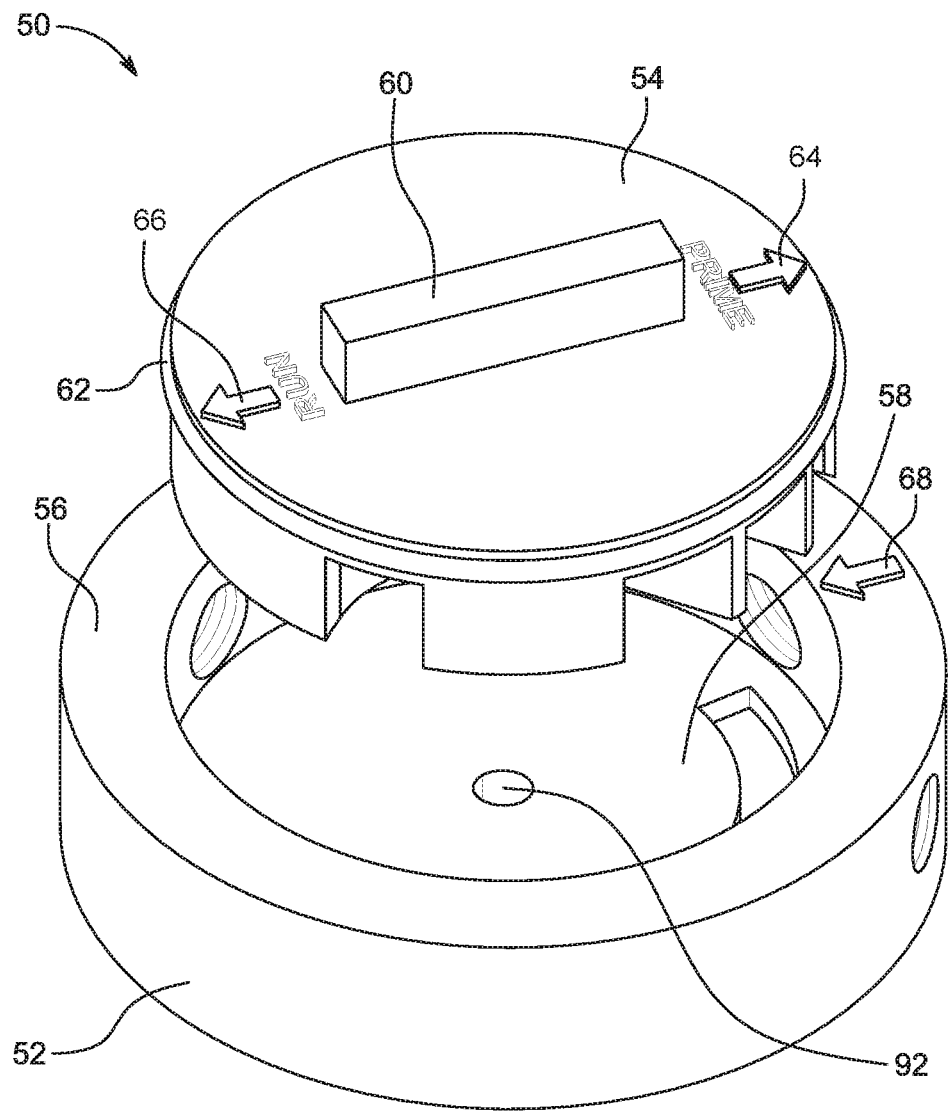
FIG. 18 is an illustration depicting an exploded view of a pump valve for use with a fluid separation assembly.
Figure 19:
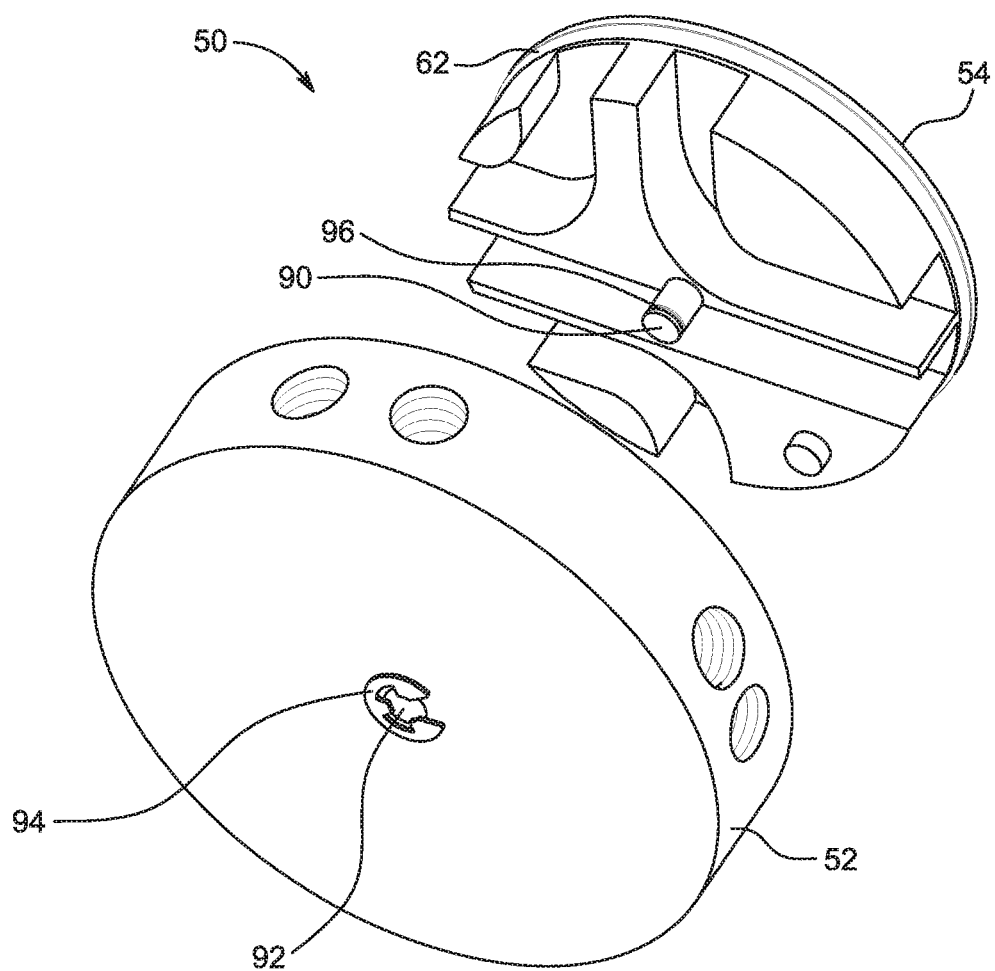
FIG. 19 is an illustration depicting another exploded view of a pump valve for use with a fluid separation assembly.

The exemplary pump valve 50 illustrated in FIGS. 18-23 includes a prime mode and a regular operation mode and is arranged to efficiently move between the prime mode and regular operation mode. As best illustrated in FIGS. 18-19, the pump valve 50 includes a housing 52 and an insert 54. The housing 52 is cylindrical in shape and includes a cylindrical wall 56, a central chamber 58 defined by the inside surface of the wall 56, and a plurality of apertures (to be further described) passing through the wall 56 of the housing 52. The insert 54 is also generally cylindrical in shape and includes a handle 60 on the upper surface and a plurality of passages (to the further described) defined on the lower surface of the insert 54. The pump valve 50 can further include a gasket or o-ring 62 positioned about the edge of the insert 54. The insert 54 is arranged such that the insert 54 can be seated into the central chamber 58 so that the top surface of the insert 54 is generally flush with the top surface of the wall 56 and the gasket 62 generally fills any gap between the insert 54 and the wall 56 to prevent any leaking of fluid through the interface of the insert 54 and the housing 52. Once the insert 54 is seated in the housing 52, the insert 54 can be rotated within the housing 52 by using the handle 62 or by other methods that will be further described herein. As will be further discussed, such rotation can align apertures in the housing 52 with passages in the insert 54 to form fluid paths through the pump valve 50. A first position of the insert 54 within the housing 52 can form an arrangement of fluid paths through the pump valve 50 that facilitates priming the pump and hoses, and a second position of the insert 54 within the housing 52 can form an arrangement of fluid paths through the pump valve 50 that facilitates regular operation of the pump, i.e., moving contaminated coolant from the reserve tank to the separation assembly 10.

Figure 20:
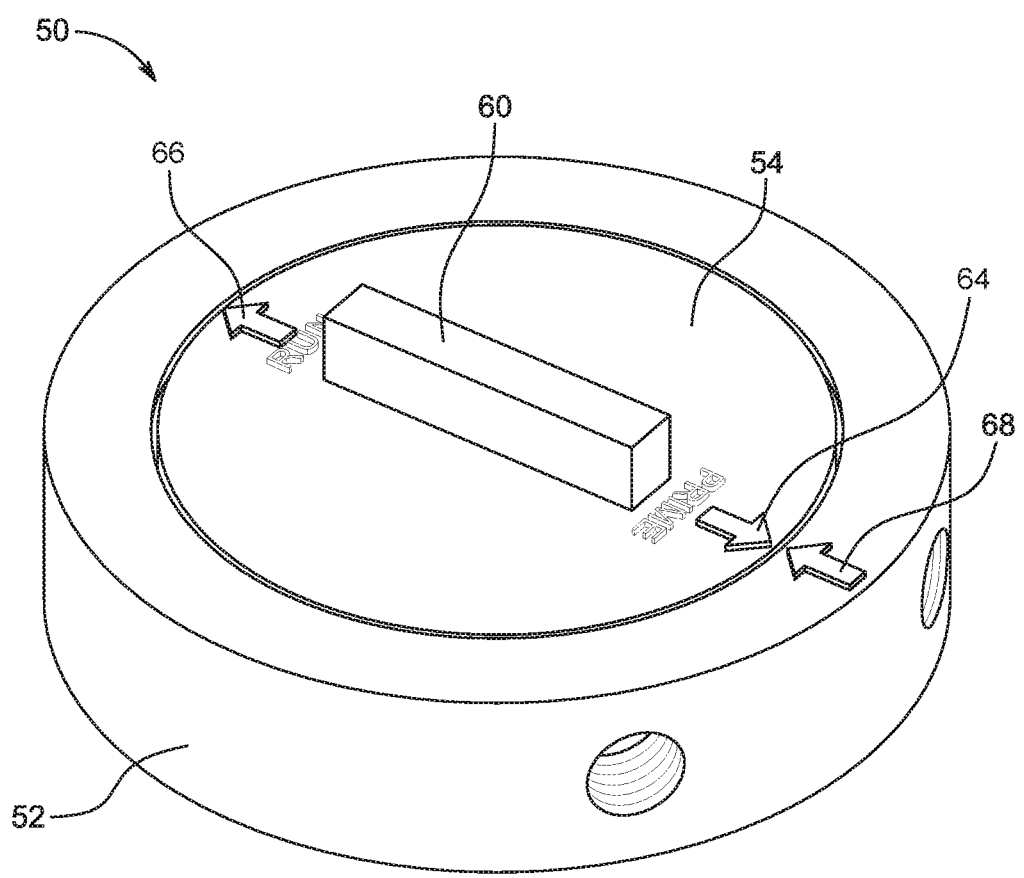
FIG. 20 is an illustration depicting a pump valve for use with a fluid separation assembly arranged to a prime mode.
Figure 21:
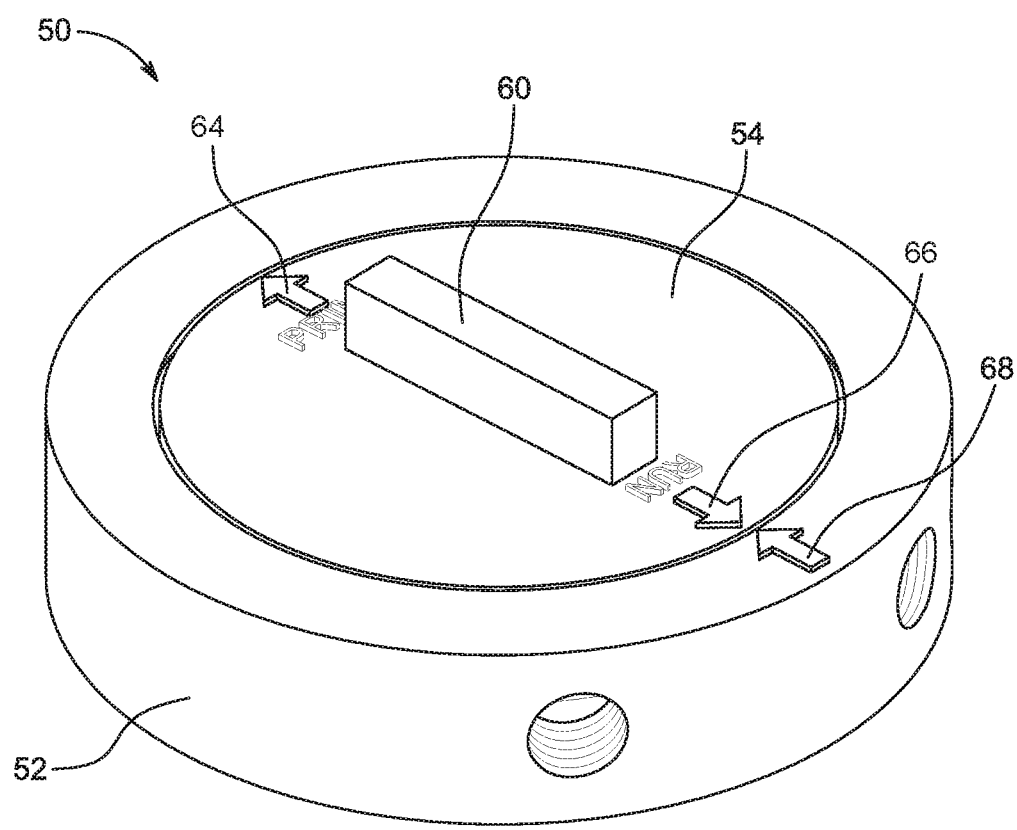
FIG. 21 is an illustration depicting a pump valve for use with a fluid separation assembly arranged to a regular operation mode.

As best illustrated in FIGS. 20-21, indicia can be formed in the housing 52 and insert 54 to assist in arranging the pump valve 50 between a priming mode and a regular operation mode. For example, the insert 54 can include a first arrow and the work "prime" (reference no. 64) embossed on the surface of the insert 54, and an second arrow and the word "run" (reference no. 66) embossed on the surface of the insert 54 positioned opposite of the first arrow 64. The housing 52 can include an arrow (reference no. 68) embossed on the top surface of the wall 56. As illustrated in FIG. 20, when the insert 54 is rotated such that the first arrow and the word "prime" 64 are aligned with the arrow 68 on the wall 56, the pump valve 50 is placed in prime mode. As illustrated in FIG. 21, when the insert 54 is rotated such that the second arrow and the word "run" 66 are aligned with the arrow 68 on the wall 56, the pump valve 50 is placed in regular operation mode. As previously discussed, the handle 60 can be used to manually rotate the insert 54 between prime mode and regular operation mode. It will also be understood that although the pump valve 80 is illustrated as arranged for manual control by an operator, the pump valve can also be arranged such that the pump valve is moved between the prime mode and the regular operation mode through automation. This is to say that electronic and mechanical components can be added to the pump valve to cause the insert to move between prime and regular operation modes automatically or selectively by a user activating a switch or other mechanism to send a signal to the pump valve cause the pump valve to switch modes.

Figure 22:
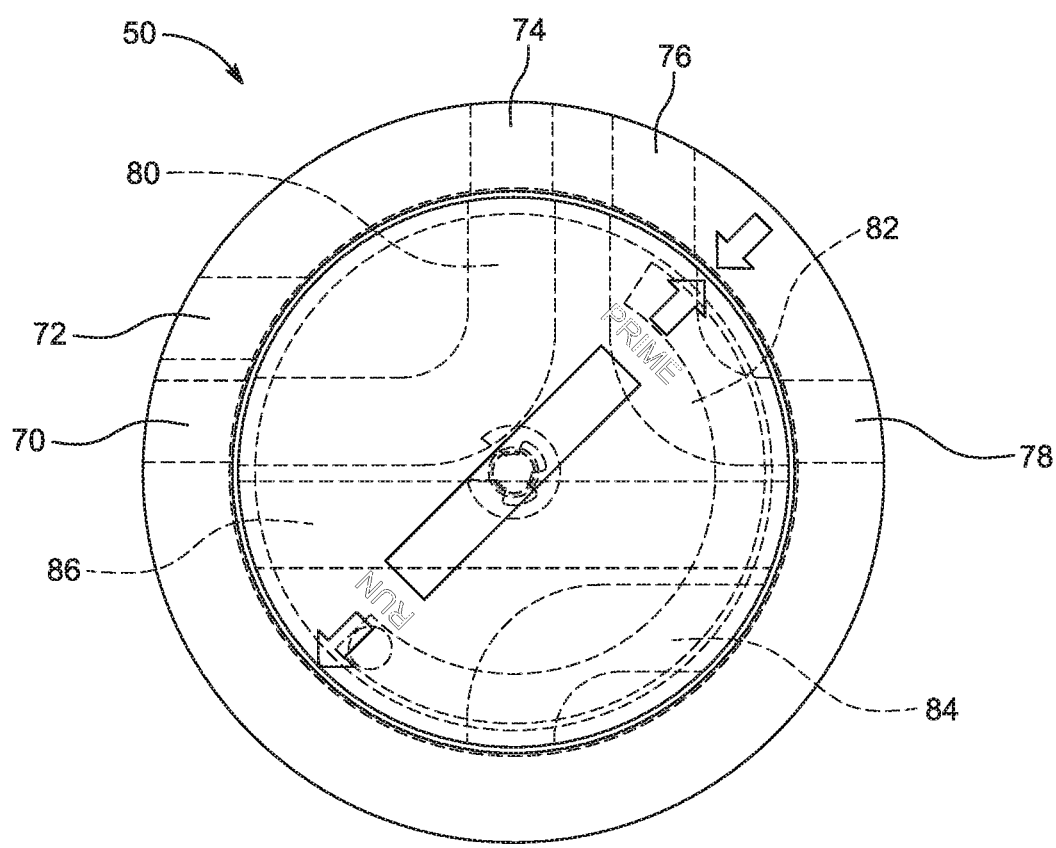
FIG. 22 is an illustration depicting a pump valve for use with a fluid separation assembly arranged to a prime mode and further depicting the arrangement of internal passages in prime mode.
Figure 23:
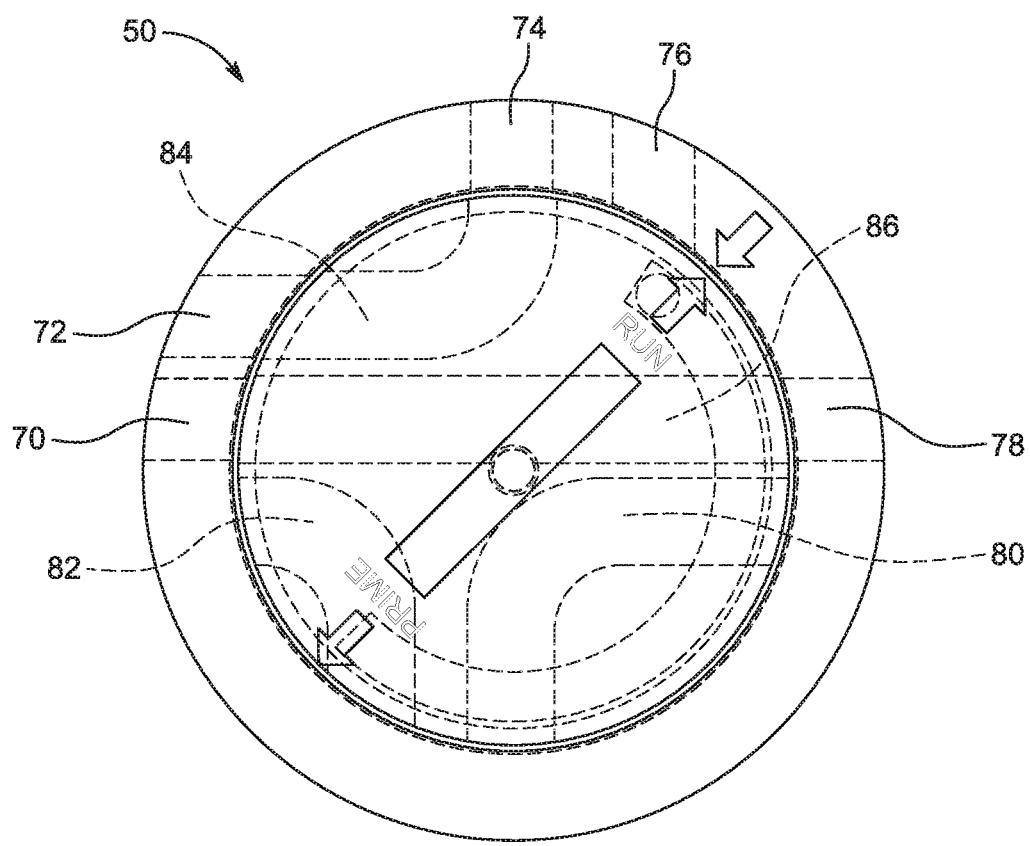
FIG. 23 is an illustration depicting a pump valve for use with a fluid separation assembly arranged to a regular operation mode and further depicting the arrangement of internal passages in regular operation mode.

As previously discussed and as best illustrated in FIGS. 22 and 23, the apertures in the wall 56 and passages in the insert 54 can align to form fluid paths that facilitate priming and regular operation of the pump. The housing 52 includes five apertures, and the insert 54 includes four passages. For convenience, the five apertures will be referred to as the first aperture 70, second aperture 72, third aperture 74, fourth aperture 76, and fifth aperture 78, and the four passages will be referred to as the first passage 80, second passage 82, third passage 84, and fourth passage 86. It will be understood that although the apertures are illustrated as simple apertures though the wall 56 of the housing 52, the apertures can include additional structure such as a connector extending from the outside of the housing 52 to facilitate connection of additional components to the pump valve 50. For example, the housing 52 can include a barbed fitting aligned with the aperture to facilitate efficiently connecting and disconnecting of a hose to place the hose in fluid communication with the aperture.

For prime mode, illustrated in FIG. 22, there are two fluid paths through the pump valve 50. The first aperture 70 and third aperture 74 are aligned with the first passage 80 to form a first fluid path, and the fourth aperture 76 and fifth aperture 78 are align with the second passage 82 to form the second fluid path. The first aperture 70 is in fluid communication with the coolant from the reserve tank of the serviced machine. Such fluid communication is typically created by attaching a hose between the first aperture 70 and the reserve tank of the serviced machine. In one embodiment, an open end of the hose can be submerged into the reserve tank to create fluid communication between the first aperture 70 and the reserve tank. In another embodiment, the reserve tank can be equipped with a connector to which the hose can be secured, such as a barbed fitting. In yet another embodiment, a floating head can be located in the reserve tank of the serviced machine, and the hose can be attached between the first aperture 70 and the floating head inside the reserve tank to create fluid communication. A filter can be optionally positioned between the reserve tank and the pump valve 50 to filter out any contaminants that could damage the pump. The fourth aperture 76 is an open port that is in fluid communication with a source of fluid such as coolant or water. In one embodiment, the fourth aperture 76 is in fluid communication with the coolant in the reserve tank of the serviced machine. Such fluid communication is typically created by attaching a hose to the fourth aperture 76 and locating the other end of the hose in the source of fluid. Alternatively, the fluid communication can be created by submerging the pump valve 50 in the source of fluid, such as submerging the pump valve 50 in the reserve tank of the serviced machine. When the source of fluid is the coolant of the serviced machine, a filter can be positioned between the reserve tank and the pump valve 50 to filter out any contaminants that could damage the pump. When the pump valve 50 is submerged in the reserve tank of the serviced machine, the pump valve 50 can be placed in a location in the reserve tank where damaging contaminants are not likely to gather. The fifth aperture 78 is in fluid communication with the inlet port of the pump, and the third aperture 74 is in fluid communication with the outlet port of the pump. Such fluid communication is created by attaching hoses between the fifth aperture 78 and the inlet port of the pump and between the outlet port of the pump and the third aperture 74. When in prime mode, the second aperture 72 and the third 84 and fourth 86 passages are not aligned to form fluid paths and are thus idle in priming mode.

With further reference to FIG. 22, once the pump is engaged, the vacuum formed by the pump will draw fluid into the pump valve 50 through the fourth aperture 76, through the second passage 82, and out of the pump valve 50 through the fifth aperture 78. Once the fluid exits the pump valve 50, it moves though the pump and reenters the pump valve 50 through the third aperture 74, moves through the first passage 80, and out of the pump valve 50 through the first aperture 70. The fluid continues through the hose attached to the first aperture 70, any filter, and to the reserve tank of the serviced machine. Once the priming operation is completed, it will be understood that fluid fills the pump and the hoses connecting the reserve tank of the serviced machine to the pump valve 50 and connecting the pump valve 50 to the pump. Thus, the pump and the overall system are prepared for regular operation.

For regular operation mode, illustrated in FIG. 23, there are also two fluid paths through the pump valve 50, but the fluid paths are different from those of the prime mode. As previously discussed, the insert 54 of the pump valve 50 is rotated about 180 degrees to move the pump valve 50 from the prime mode to regular operation mode. The first aperture 70 and fifth aperture 78 are aligned with the fourth passage 86 to form a first fluid path, and the second aperture 72 and third aperture 74 align with the third passage 84 to form the second fluid path. As in prime mode, the first aperture 70 is in fluid communication with the coolant from the reserve tank of the serviced machine. As previously noted, such fluid communication is typically created by attaching a hose between the first aperture 70 and the reserve tank, and a filter can be positioned between the reserve tank and the pump valve 50 to filter out any contaminants that could damage the pump. As in the prime mode, the fifth aperture 78 is in fluid communication with the inlet port of the pump, and the third aperture 74 is in fluid communication with the outlet port of the pump. Such fluid communication is created by attaching hoses between the fifth aperture 78 and the inlet port of the pump and between the outlet port of the pump and the third aperture 74. The second aperture 72 is in fluid communication with the fluid separation assembly 10. Such fluid communication can be created by attached a hose between to the second aperture 72 and the fluid inlet 18 of the fluid separation assembly 10. When in regular operation mode, the fourth aperture 76 and the first 80 and third 84 passages are not aligned to form fluid paths and are thus idle in regular operation mode.

With further reference to FIG. 23, once the pump is engaged, the pump will draw coolant from the reserve tank of the serviced machine into the pump valve 50 through the first aperture 70, through the fourth passage 86, and out of the pump valve 50 through the fifth aperture 78. Once the fluid exits the pump valve 50, it moves though the pump and reenters the pump valve 50 through the third aperture 74, moves through the third passage 84, and out of the pump valve 50 through the second aperture 72. The fluid continues through the hose attached to the second aperture 72 and into the fluid separation assembly 10 through the fluid inlet 18.

Although the pump valve 50 has been described in association with the fluid separation apparatus 10 described herein, it will be understood that the pump valve 50 can be used with other system. For example, the pump valve 50 can be used to prime electrical pumps. In one embodiment, the pump valve 50 can be used with irrigation systems to prime a pump, such as an electrical pump, and for regular operation of the irrigation system. In such an embodiment, in prime mode, the fourth aperture 76 can be in fluid communication with a source of water, such as the source of water used for irrigation, and the pump and system of hoses used by the irrigation system can be primed by filling the pump and hoses with water. In regular operation the second aperture 72 can be in fluid communication with sprinkler heads or other apparatus used to dispense water in the irrigation system. It will be understood that the examples provided herein are not exhaustive of all the used of the disclosed pump valve. The pump valve can be used in any number of fluid control systems that require two modes of operation.

The pump valve 50 can include additional features and components. For example, the insert 54 can include a stem 90 extending from the bottom surface of the insert 54. The housing 52 can include a corresponding aperture 92 through the bottom surface of the housing 52. When the insert 54 is seated in the housing 52, the stem 90 is engaged with the aperture 92 to correctly position and orient the insert 54 within the housing 52 and to facilitate the rotation of the insert 54 within the housing 52. A gasket 94 can be positioned in the aperture 92 to seal the engagement between the stem 90 and aperture 92 to prevent fluids from leaking out of the pump valve 50. Alternatively or additionally, a gasket or o-ring 96 can be fitted about the stem 90 to further prevent fluids from leaking out of the pump valve 50.

In one embodiment, the dimensions of the main housing 12 are approximately 21 inches in width, approximately 17 inches in height, and approximately 7 inches is depth. The separation chamber 26 and filtered coolant chamber 28 each occupy about half of the internal volume of the main housing 12. In such an embodiment, the fluid separation assembly 10 can operate at a flow rate of about 300 gallons per hour. It will be understood that a fluid separation assembly can be arranged to operate at higher or lower flow rates to accommodate various fluid separation and filtering operations. It will also be understood that the dimensions of the components of a fluid separation assembly can be designed based on the needs of specific industrial machines and processes.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A fluid separation assembly comprising:
   a housing comprising:
      a first chamber;
      a second chamber;
      a wall separating the first chamber and second chamber; and
      a fluid passage positioned between the first chamber and the second chamber;
   a fluid inlet attached to the housing and in fluid communication with the first chamber;
   a fluid outlet attached to the housing and in fluid communication with the second chamber;
   a mounting bracket arranged such that the housing can be secured to the mounting bracket, the mounting bracket comprising:
      a first lower hook positioned proximate to the bottom of the mounting bracket;
      a second lower hook positioned proximate to the bottom of the mounting bracket and spaced apart from the first lower hook;
      a first upper hook positioned proximate to the top of the mounting bracket;
      a second upper hook positioned proximate to the top of the mounting bracket and spaced apart from the first upper hook; and
      a third upper hook positioned proximate to the top of the mounting bracket and spaced apart from the first upper hook and second upper hook;
   coalescing media positioned in the first chamber; and
   a cover reversible secured to the housing.

2. The fluid separation assembly of claim 1, further comprising:
   a first spigot attached to the housing and in fluid communication with the first chamber; and
   a second spigot attached to the housing and in fluid communication with the second chamber.

3. The fluid separation assembly of claim 1, wherein the housing comprises:
   a first slot arranged to accommodate the first lower hook and positioned proximate to the bottom of the housing;
   a second slot arranged to accommodate the second lower hook and positioned proximate to the bottom of the housing; and
   a third slot arranged to accommodate the first upper hook and positioned proximate to the top of the housing.

4. The fluid separation assembly of claim 3, wherein the housing comprises:
   a fourth slot arranged to accommodate the second lower hook and positioned proximate to the bottom of the housing and opposite the first slot;
   a fifth slot arranged to accommodate the first lower hook and positioned proximate to the bottom of the housing and opposite the second slot; and
   a sixth slot arranged to accommodate the first upper hook and positioned proximate to the top of the housing and opposite the third slot.

5. The fluid separation assembly of claim 1, further comprising a reservoir attached to the housing and positioned proximate to the fluid outlet.

6. The fluid separation assembly of claim 1, further comprising a diverter attached to the housing and positioned proximate to the fluid inlet.

7. The fluid separation assembly of claim 1, further comprising one or more magnets secured to the mounting bracket.

8. The fluid separation assembly of claim 1, wherein the coalescing media includes a lattice-like structure.

9. The fluid separation assembly of claim 8, wherein the coalescing media positioned in the first chamber includes a plurality of folds and generally fills the first chamber.

10. A fluid separation assembly comprising:
    a mounting bracket comprising:
       a first lower hook positioned proximate to the bottom of the mounting bracket;
       a second lower hook positioned proximate to the bottom of the mounting bracket and spaced apart from the first lower hook; and
       an upper hook positioned proximate to the top of the mounting bracket;
    a housing arranged such that the housing can be secured to the mounting bracket, the housing comprising:
       a first slot arranged to accommodate the first lower hook and positioned proximate to the bottom of the housing;
       a second slot arranged to accommodate the second lower hook and positioned proximate to the bottom of the housing; and
       a third slot arranged to accommodate the upper hook and positioned proximate to the top of the housing;
       a first chamber;
       a second chamber;
       a wall separating the first chamber and second chamber; and
       a fluid passage positioned between the first chamber and the second chamber;
    a fluid inlet attached to the housing and in fluid communication with the first chamber;
    a fluid outlet attached to the housing and in fluid communication with the second chamber;
    coalescing media positioned in the first chamber; and
    a cover reversible secured to the housing.

11. The fluid separation assembly of claim 10, further comprising:
   a first spigot attached to the housing and in fluid communication with the first chamber; and
   a second spigot attached to the housing and in fluid communication with the second chamber.

12. The fluid separation assembly of claim 10, wherein the housing comprises:
   a fourth slot arranged to accommodate the second lower hook and positioned proximate to the bottom of the housing and opposite the first slot;
   a fifth slot arranged to accommodate the first lower hook and positioned proximate to the bottom of the housing and opposite the second slot; and
   a sixth slot arranged to accommodate the upper hook and positioned proximate to the top of the housing and opposite the third slot.

13. The fluid separation assembly of claim 10, further comprising a reservoir attached to the housing and positioned proximate to the fluid outlet.

14. The fluid separation assembly of claim 10, further comprising a diverter attached to the housing and positioned proximate to the fluid inlet.

15. The fluid separation assembly of claim 10, further comprising one or more magnets secured to the mounting bracket.

16. The fluid separation assembly of claim 10, wherein the coalescing media includes a lattice-like structure.

17. The fluid separation assembly of claim 16, wherein the coalescing media positioned in the first chamber includes a plurality of folds and generally fills the first chamber.

* * * * *